United States Patent [19]

Pesando

[11] 4,319,722
[45] Mar. 16, 1982

[54] TRAVERSER AND COMPONENTS THEREFOR

[76] Inventor: Mario Pesando, 3570 Hawkestone Rd., Mississauga, Ontario, Canada

[21] Appl. No.: 36,850

[22] Filed: May 7, 1979

[51] Int. Cl.³ .............................. B64F 1/22; B64F 1/12
[52] U.S. Cl. ...................................... 244/116; 114/261
[58] Field of Search ...................... 244/17.17, 50, 115, 244/116; 114/261

[56] References Cited

U.S. PATENT DOCUMENTS

| | | | |
|---|---|---|---|
| 3,151,826 | 10/1964 | Michel | 244/115 |
| 3,303,807 | 2/1967 | Stewart et al. | 244/115 |
| 3,640,490 | 2/1972 | Baekken | 244/116 |
| 3,659,813 | 5/1972 | Mesnet et al. | 244/116 |
| 3,790,111 | 2/1974 | Mesnet et al. | 244/116 |
| 3,830,452 | 8/1974 | Seay | 244/116 |

Primary Examiner—Charles E. Frankfort
Attorney, Agent, or Firm—Ivor M. Hughes

[57] ABSTRACT

A traverser and traversing system for traversing a helicopter having a tricycle undercarriage with a nose wheel as for example, the Sea Lynx, and a helicopter having a rear wheel, as for example, a Sea King, is provided, for traversing the helicopter from its landing on a ship's deck to the hangar for storage, or in the alternative, from the hangar to its take-off position. The traversing system comprises a traverser, a track on the deck for carrying and guiding the traverser on the deck and control system for controlling the movement of the traverser. The traverser has a low profile for utilization under the helicopter and comprises a base for securing to the track, a cross member carried by the base for mounting the carriage for movement, a control system (including brakes) for controlling the sliding of the carriage to secure the helicopter to the traverser. A method employing the traversing system is also provided to minimize the manual labor employed in moving a helicopter on landing to storage in the hangar and vice versa.

19 Claims, 47 Drawing Figures

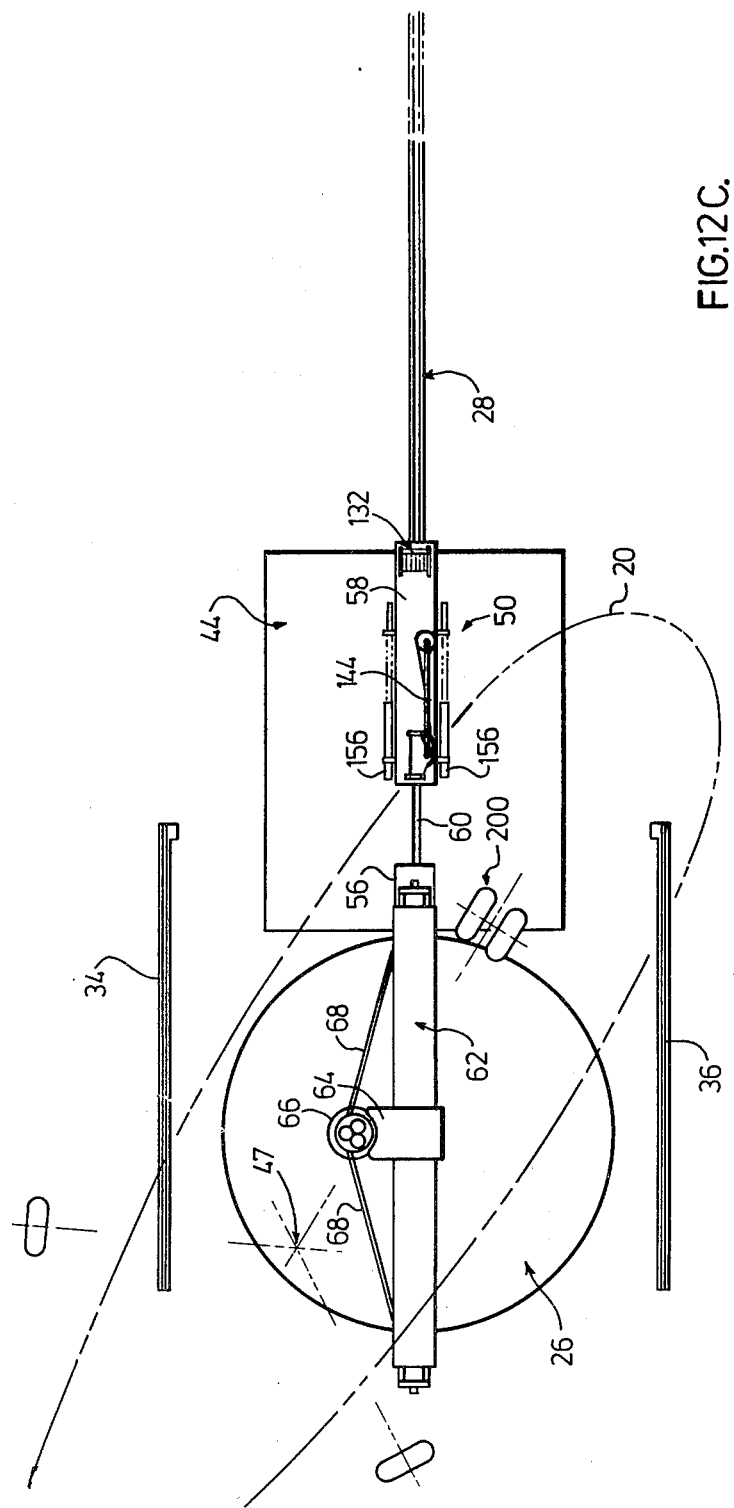

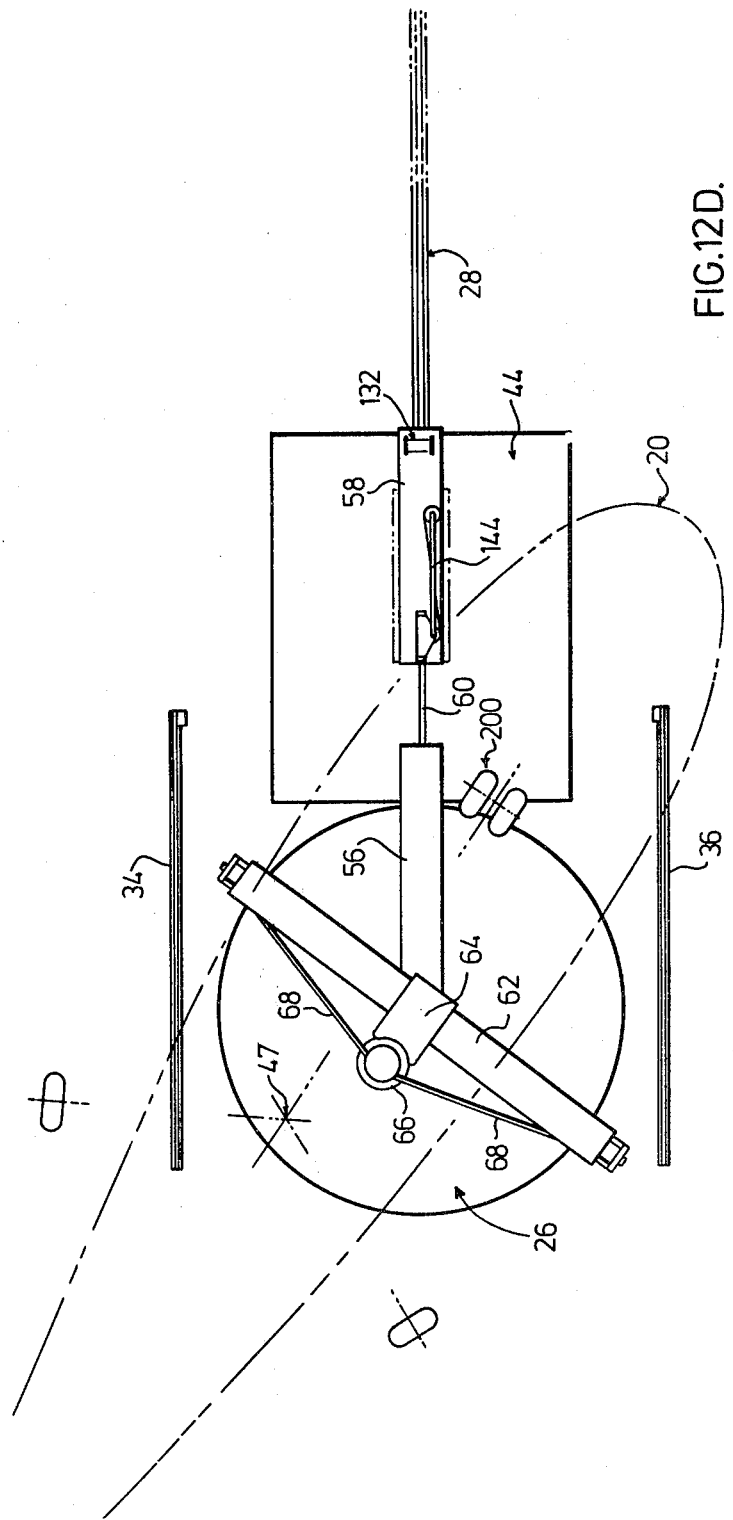

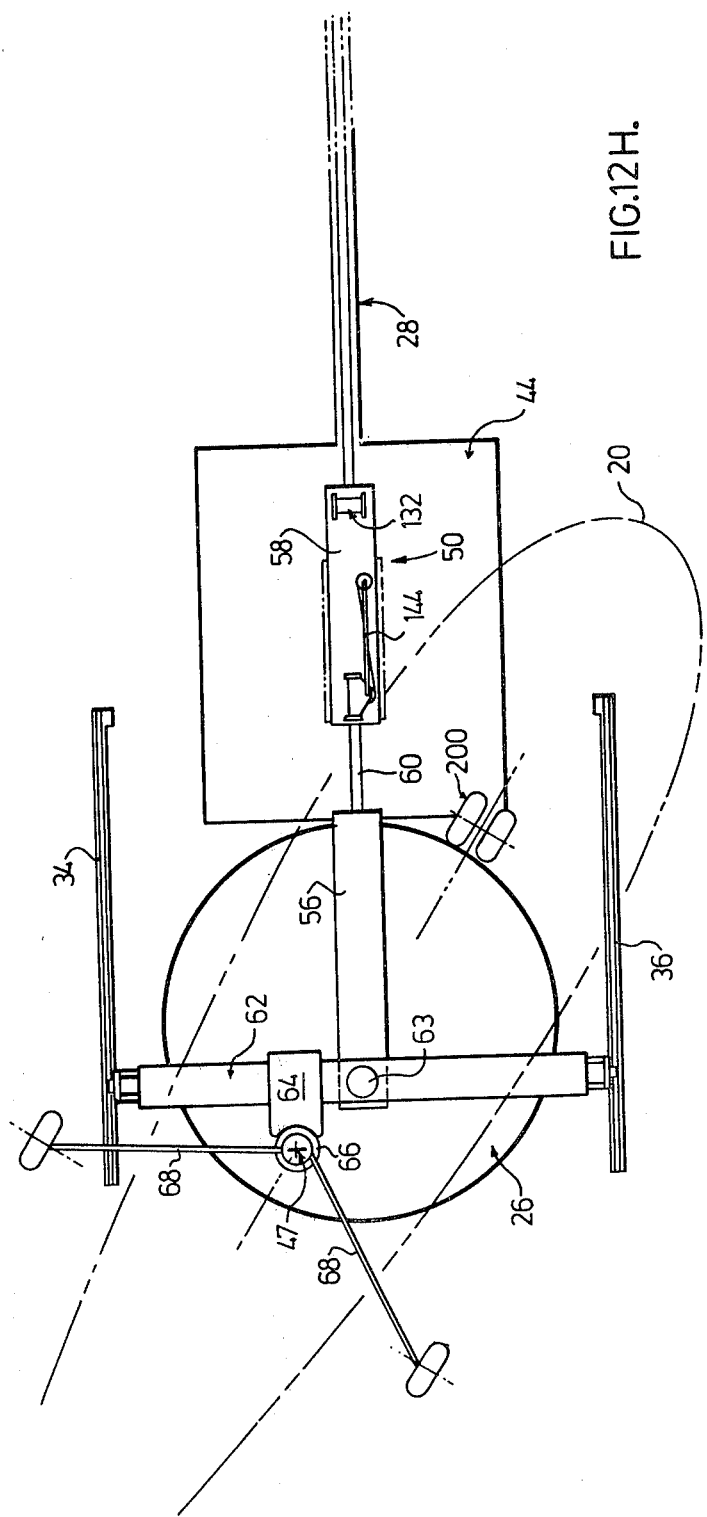

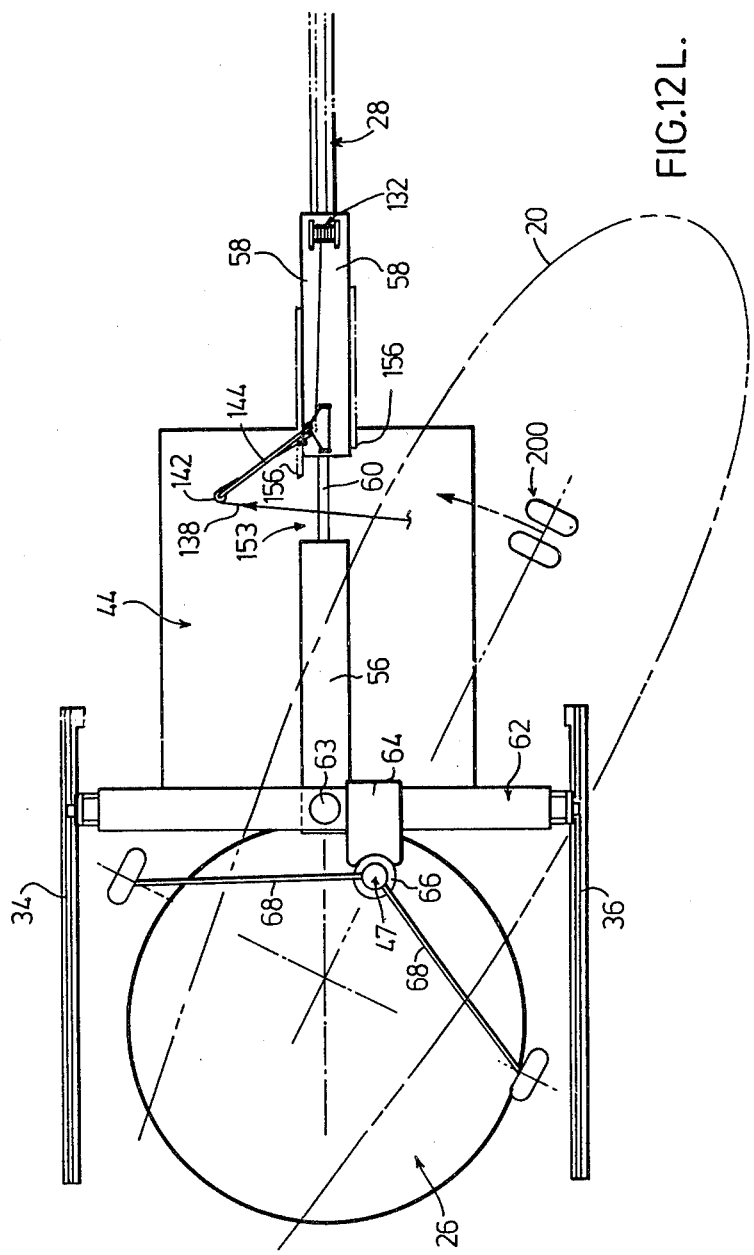

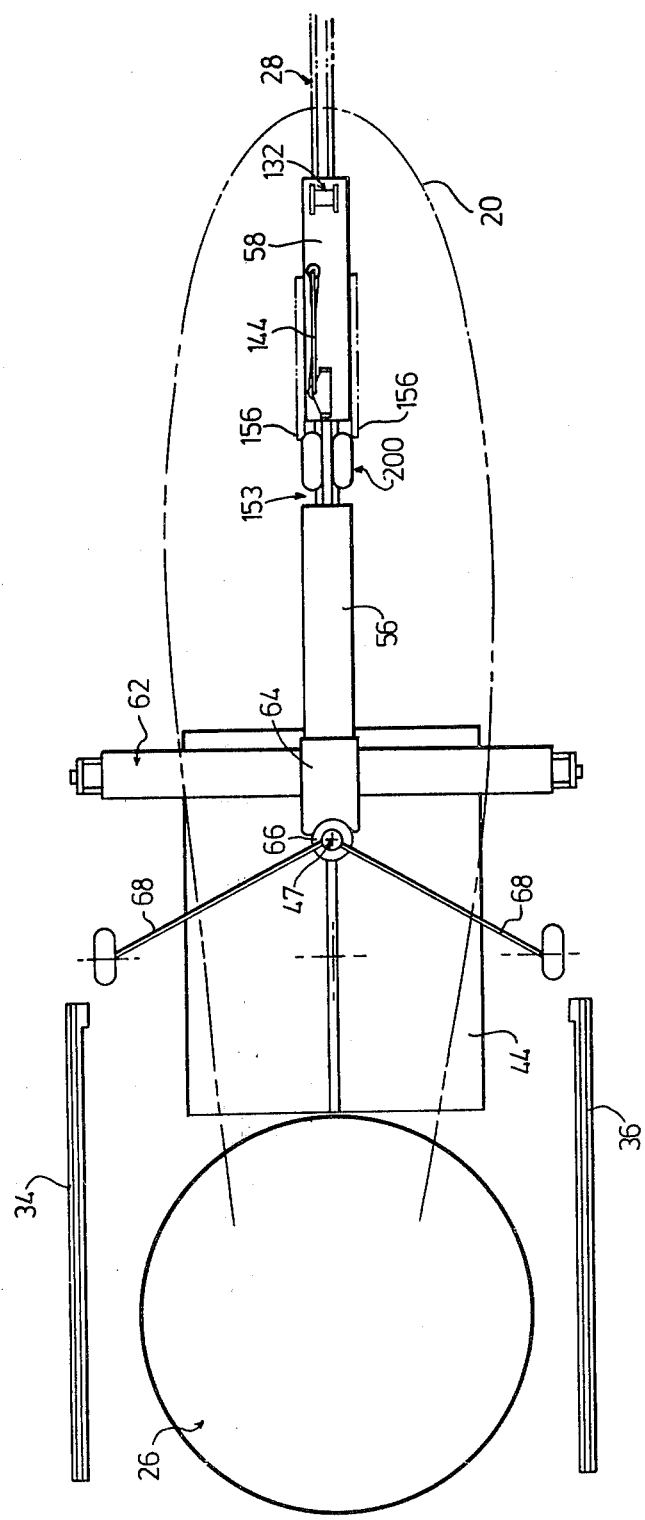
FIG.12.O.

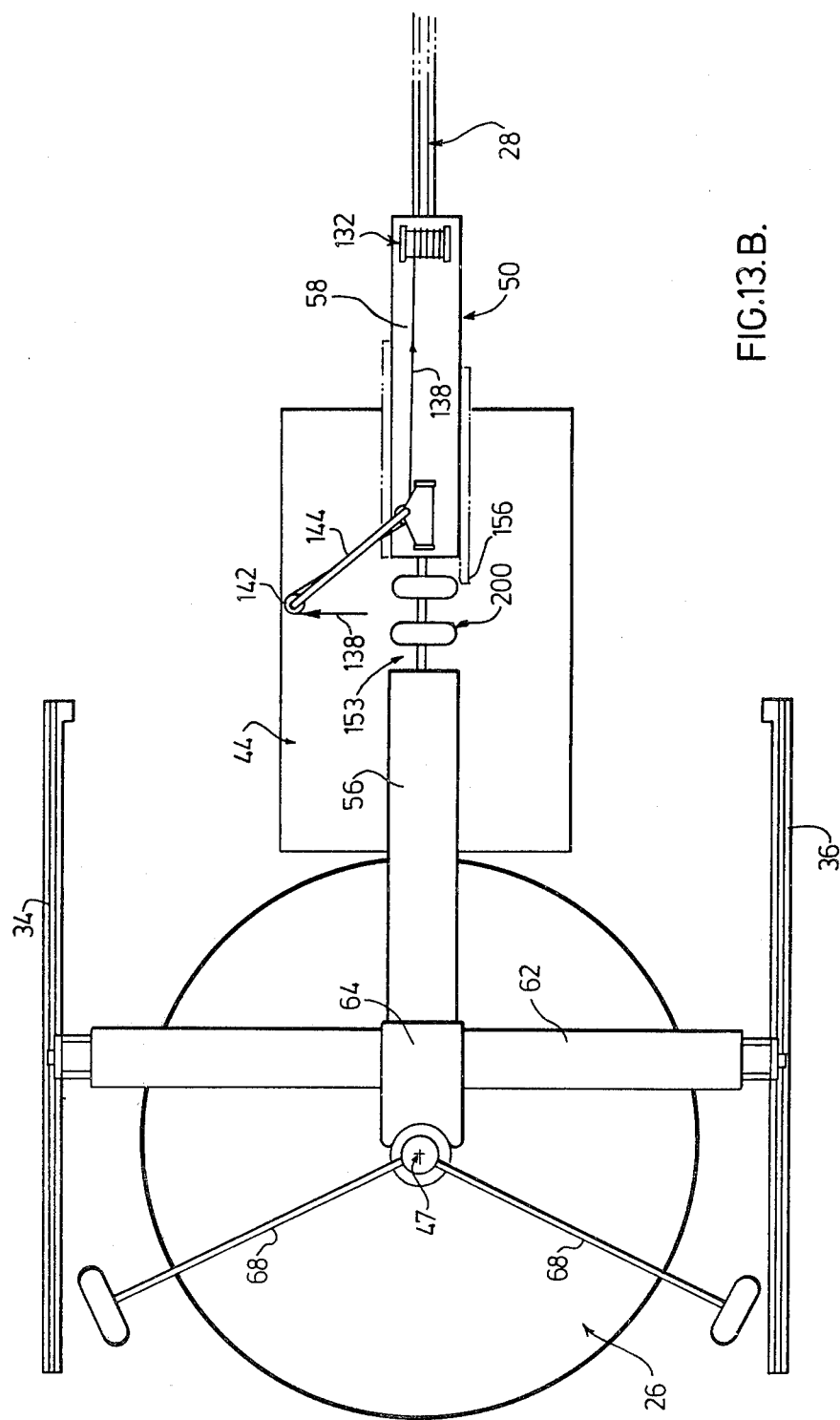
FIG.13.B.

TRAVERSER AND COMPONENTS THEREFOR

FIELD OF INVENTION

This invention relates to a traversing system, components and subassemblies therefor, and a novel method of employing such system, for traversing a helicopter on the deck of a ship.

BACKGROUND OF THE INVENTION

Helicopters have now become entrenched as an integral part of the weapons system carried by destroyers and frigates, in an anti-submarine search and strike capacity. Invariably landings and take-offs of these helicopters from the vessels must be made in moderate to severe turbulence and once on the deck, the helicopter must be quickly secured and stored for protection from the environment.

Two helicopters so used are the Westland Sea Lynx (t.m.) and Sea King (t.m.).

The Sea Lynx is a high performance helicopter which operates at a maximum All-Up-Weight of 10,000 pounds. It is powered by two Rolls Royce RS360 free turbine engines which are mounted side by side, on top of the fuselage behind the rotor. The Naval Version, developed and built to meet the requirements of both the Royal and French Navies for a manned-ship borne helicopter, incorporates special high energy absorption pneumatic tricycle landing gear and a pronged harpoon deck lock securing system. This deck lock securing system extends from the underbelly of the helicopter intermediate the dual-nose wheel and single main wheel units for engaging a special passive grid insert in the ship's deck. On landing, the deck lock system is hydraulically operated, rapidly engaging and locking on the passive ship mounted grid, and then tensioned to secure the helicopter with some 1,360 kg. (3,000 lbs.) of load tension between the helicopter and the deck.

Subsequently, the helicopter is moved to the hangar for maintenance and protection from direct damage from high seas and the corrosive effect of salt spray.

For maximum maneuverability and reliability, the nose wheel assembly of the Sea Lynx is hydraulically castered through 90° and the main wheels may either be fixedly toed out at an angle of 27° for deck landings or manually castered in line and locked fore and aft to allow the helicopter to be traversed into and out of the ship's hangar. Sprag brakes (wheel locks) fitted to each wheel prevent rotation on landing or inadverent deck roll.

The Sea King, a 20,000 pound helicopter, on the other hand, includes a conventional undercarriage comprising a rear wheel free wheeling through 360° and a pair of spaced dual wheel units on either side, and near the nose, of the helicopter. For recovery, employing the RAST System (Recovery Assist Secure and Traverse System) for helicopter recovery, the Sea King mounts externally on its underside an airborne messenger winch intermediate the rear wheel and pair of dual wheel units. The messenger winch holds a light duty cable with a messenger link and a lock assembly for the flydown cable. When the flydown cable from the self-centering and self-balancing sliding bell mouth is secured to the messenger winch, a constant tension is maintained in the cable until the helicopter is landed safely. Once the helicopter has landed an increased tension is applied automatically by the electric tension winch for securing the helicopter.

After landing, the Sea King Helicopter is likewise moved into the hangar.

It is therefore an object of this invention to provide a traversing system, components and sub-assemblies therefor, which permits the helicopter to be relatively easily secured to the traversing system and which permits the helicopter to be safely transported to and from the hangar with minimum manipulation.

It is a further object of the invention to provide such a traversing system, components and sub-assemblies therefor, which system acts as a direct connection between the helicopter and the ship permitting centering, aligning, and traversing the helicopter relative to the ship deck.

It is a further object of the invention to provide a traversing system, components and sub-assemblies therefor, which system employs minimal forces on the helicopter when used for traversing.

It is a further object of this invention to provide a traversing system, components and sub-assemblies therefor which system requires minimal modifications to the ship deck, helicopter, or haul-down systems employed.

It is also an object of this invention to provide a method for traversing a helicopter which requires minimal manipulation of the helicopter.

Further and other objects of the invention will be realized from the following summary and detailed description of the preferred embodiments thereof.

SUMMARY OF THE INVENTION

According to one aspect of the invention, a traversing system and a traverser for use in the system are provided, the traverser being of a low profile for clearance under the helicopter without interfering with the helicopter recovery system employed and being relatively narrow in width, for securing to the helicopter for traversing the helicopter to and from a hangar, the traversing system incorporating the traverser, means securing the traverser to the ship's deck and for guiding the traverser to and from the hangar and a position proximate the landing position of the helicopter, and control means for controlling the movement of the traverser, the traverser further comprising a narrow base (in width) secured to the means securing the traverser to the ship's deck and for guiding the traverser to and from the hangar, relatively long relatively narrow carrier, means on the base for mounting a carriage for movement of the carriage thereon said means on the base being oriented at substantially 90° to the direction of the movement of the base, when the helicopter is secured to the traverser the means on the base for mounting the carriage for movement of the carriage thereon, preferably comprising a cross-beam assembly carried by the base (in one embodiment to pivot from a position parallel to the base to a position to extend substantially at right angles to the direction of movement of the base when securing the helicopter to the traverser), a carriage slidable on the means on the base for mounting the carriage, control means for controlling the sliding of the carriage and retaining means carried by the carriage for use to secure the helicopter to the traverser.

For additional stability, supports may extend from the transverser for securing to the pair of laterally spaced wheel units of the helicopter. Particularly, with respect to traversing the Sea Lynx, pivotable struts extend from the retaining means or carriage for securing to the laterally spaced single wheel units to triangulate the retaining means-harpoon connection for stabilizing the harpoon when secured to the retaining means. With respect to traversing the Sea King, independently adjustable cables extend from the traverser and are secured to the laterally spaced wheel units for both securing the helicopter and positioning the helicopter with respect to the traverser. In this regard, separate cables, supported separately on the traverser to be capable of independent use are provided, preferably on independently operable winches or reels carried by the traverser, the cables to be played out or taken up for acting on one or both of the dual wheel units for orienting or maneuvering the Sea King Helicopter as the need arises.

According to another aspect of the invention, the cross-beam assembly may be pivotal from a position parallel to the traverser base to a position substantially at right angles to the base.

According to another aspect of the invention, when the cross-beam assembly is pivotal, the ends of the cross-beam assembly includes restrainers for securing the cross-beam in guides situate on either side of deck mounted means used for securing the helicopter to the deck when the cross-beam assembly is pivoted to a position substantially at right angles to the base and which restrainers are not interfered with by the laterally spaced guides when the traverser is withdrawn away from the deck mounted means for securing the helicopter towards the hangar.

According to another aspect of the invention, the base includes a wheel receiving recess for securing a nose wheel of a helicopter and means to draw the nose wheel into the recess and secure it therein.

According to another aspect of the invention, the means to draw the nose wheel into the recess comprises a gantry mounted on the base pivotable to extend from either side of the base, a winch, a cable stored on the winch for passage over the gantry and means secured to the ends of the cable to be secured to the nose wheel of a helicopter for drawing the nose wheel of the helicopter into the nose wheel receiving recess when the winch is activated to take-up the cable.

According to another aspect of the invention, the traverser may be controlled electrically employing cables played out and taken up on winches for moving the traverser on the deck's surface.

According to another aspect of the invention, when the traversing system is used for traversing the Sea Lynx helicopter to, and from, a hangar the traverser has a low profile for passage under the helicopter without interfering with the passive grid, and comprises a base having a nose wheel receiving recess therein for receiving the nose wheel of the Sea Lynx helicopter, means for drawing the nose wheel into the recess and means securing the nose wheel therein, a cross-beam assembly carried by and secured to the base for relative pivotal movement with respect thereto from a position co-linear with the base to a position substantially at right angles thereto, restrainers on the ends of the cross-beam for removably securing guides secured to the ship deck on either side of the passive grid for receiving the harpoon when the cross-beam is pivoted substantially at right angles to the base for assisting to secure the cross-beam, a carriage slidably secured to the cross-beam for relative movement with respect thereto, control means for controlling the carriage movement on the cross-beam, retaining means carried by the carriage for use to secure the helicopter to the traverser, the retaining means comprising a miniature passive grid of similar construction to the passive grid mounted in the deck used for securing the Sea Lynx by means of its hydraulically operated harpoon to the deck of the ship, and supports extending from the carriage or retaining means for securing to the laterally spaced single wheel units for triangulating the retaining means and harpoon when the harpoon is secured to the retaining means for stabilizing the harpoon when secured to the retaining means.

According to another aspect of the invention, the restrainers on the ends of the cross-beam each comprise rollers pivotally supported on the ends of the cross-beam for pivoting from a position co-planar with the plane of the cross-beam to a position at right angles thereto and when pivoted to a position at right angles thereto, being pivotable to move inwardly towards the other roller on the other end of the cross-beam and means are provided to lock the rollers in the inwardly pivoted position, and the guides situate on either side of the passive grid for receiving the restrainers are open at their ends nearest the hangar to permit the rollers when pivoted to a position at right angles to the cross-beam to enter and exit from the guides.

According to another aspect of the invention, when the traversing system is used for traversing a Sea King helicopter to and from a hangar the traverser has a low clearance profile for passage under the helicopter and comprises a base, a cross-beam assembly carried by the base at substantially right angles to the base, a carriage slidably secured to the cross-beam for relative movement with respect thereto, control means for controlling the carriage's movement on the cross-beam and retaining means carried by the carriage for use to secure the helicopter to the traverser, the retaining means to grasp the winch housing mounted on the Sea King Helicopter. Preferably, supports in the form of separately operable cables extend from the traverser for securing to the spaced single wheel units intermediate the length of the body of the helicopter, for stabilizing the helicopter and for orienting the helicopter when secured to the traverser.

According to another aspect of the invention, a novel method of traversing a helicopter from a point of landing on a ship's deck to the hangar is provided, employing a traverser comprising a narrow base (in width), relatively long relatively narrow means on the base for mounting a carriage for sliding at substantially right angles to the direction of movement of the base, a carriage movable on the means on the base for mounting the carriage, the carriage for holding a retainer for enabling the helicopter to be secured thereto and control means for controlling the movement of the carriage on the means on the base for mounting the carriage, the method comprising the steps of:

(a) orienting the helicopter on landing so that the line formed between the mid-point of the laterally spaced wheels, and the third independent wheel extends across the line of movement of the traverser;

(b) moving the traverser to secure the helicopter thereto and securing the helicopter thereto;

(c) withdrawing the traverser towards the hangar and permitting the carriage to move freely on the means mounting the carriage until the retainer overlies the line of movement of the traverser;

(d) moving the traverser a predetermined distance from that point so that the mid-point of distance between the laterally spaced wheels of the undercarriage overlies the line of movement of the traverser;

(e) orienting the helicopter to extend in the same direction as the direction of movement of the traverser;

(f) withdrawing the traverser towards the hangar.

According to another aspect of the invention, a novel method of traversing Sea Lynx helicopters with a tricycle undercarriage having a nose wheel is provided, employing a traverser clearing the deck of a ship for passage under the helicopter, the traverser having a narrow base (in width) a cross-beam assembly pivotally secured to the base from a position co-linear with the base to a position substantially at right angles to the base, a carriage controllably slidable on the cross-beam assembly, a retainer carried by the carriage for securing the helicopter to the traverser, restrainers on the ends of the cross-beam assembly for assisting to secure the cross-beam assembly at substantially right angles to the base the restrainers for securing in guides on either side of the passive deck grid, struts secured to the carriage or retainer for securing to the pair of laterally spaced wheels and a nose wheel recess in the base for receiving the nose wheel of the Sea Lynx and means for securing the nose wheel therein, the method comprising the steps of:

(a) positioning the helicopter on landing with respect to the grid the deck of the ship so that the line formed between the harpoon and the nose wheel intersects the line of movement of the traverser or an extension of it;

(b) moving the traverser past the nose wheel of the helicopter with the cross-beam substantially parallel to the base, and pivoting the cross-beam to a position substantially at right angles to the base and securing the restrainers in the guides;

(c) positioning the retaining means on the cross-beam assembly adjacent the harpoon to be secured thereto, and securing the harpoon;

(d) with the nose wheel aligned in the direction of the body of the helicopter, and the carriage being freely slidable on the cross-beam, withdrawing the traverser towards the hangar, until the retaining means passes over the line of movement of the traverser (or an extension thereof) and continuing the withdrawal of the traverser for a predetermined distance of 25.5" for positioning the center of the line joining the two laterally spaced wheels over the line (or extension thereof) along which the traverser moves;

(e) rotating the helicopter to move the nose wheel into a recess in the traverser base and securing same within the recess with the dual wheels aligned parallel to the direction of movement of the traverser;

(f) withdrawing the helicopter into the hangar;

According to another aspect of the invention, a novel method of traversing helicopters with a conventional undercarriage, having a free wheeling rear wheel and a pair of forwardly aligned wheel units of the Sea King variety, employing a traverser comprising a base, means to carry a carriage for slidable movement thereon preferably being a cross-beam assembly carried by the base, a carriage controllably movable on the means to carry the carriage, a retainer for securing the helicopter to the traverser, independently operable cables for securing to the pair of forwardly fixed wheel units, comprising the steps of:

(a) positioning the helicopter on landing with respect to the securing system of the ship so that the line formed between the securing system and rear wheel intersects the line of movement of the traverser (or an extension thereof);

(b) moving the traverser and carriage adjacent the member of the helicopter to be secured thereto, and securing it thereto;

(c) securing the independently operable cables to the laterally spaced wheel units for independently acting on one or both;

(d) withdrawing the traverser towards the hangar, the carriage being freely slidable on the means to carry the carriage until the retaining means passes over the line of movement of the traverser or an extension thereof and moving the traverser a predetermined distance therefrom until the center of the line joining the spaced wheel units coincides with the line of movement of the traverser (in respect of the Sea King, the helicopter is backed-up 20.5");

According to another aspect of the invention, an indicator is provided to indicate when the carriage passes over the center line along which the traverser moves and an indicator indicates when the carriage has moved that predetermined additional distance.

It is of course understood, that means are provided for operating the traverser as for example, hydraulic or electric means and winches applied where the use of cable is most desirous.

BRIEF DESCRIPTION OF THE DRAWINGS

The invention will now be illustrated with reference to the following drawings illustrating preferred embodiments of the invention in which.

DETAILED DESCRIPTION OF THE PREFERRED EMBODIMENTS

Figure 1:
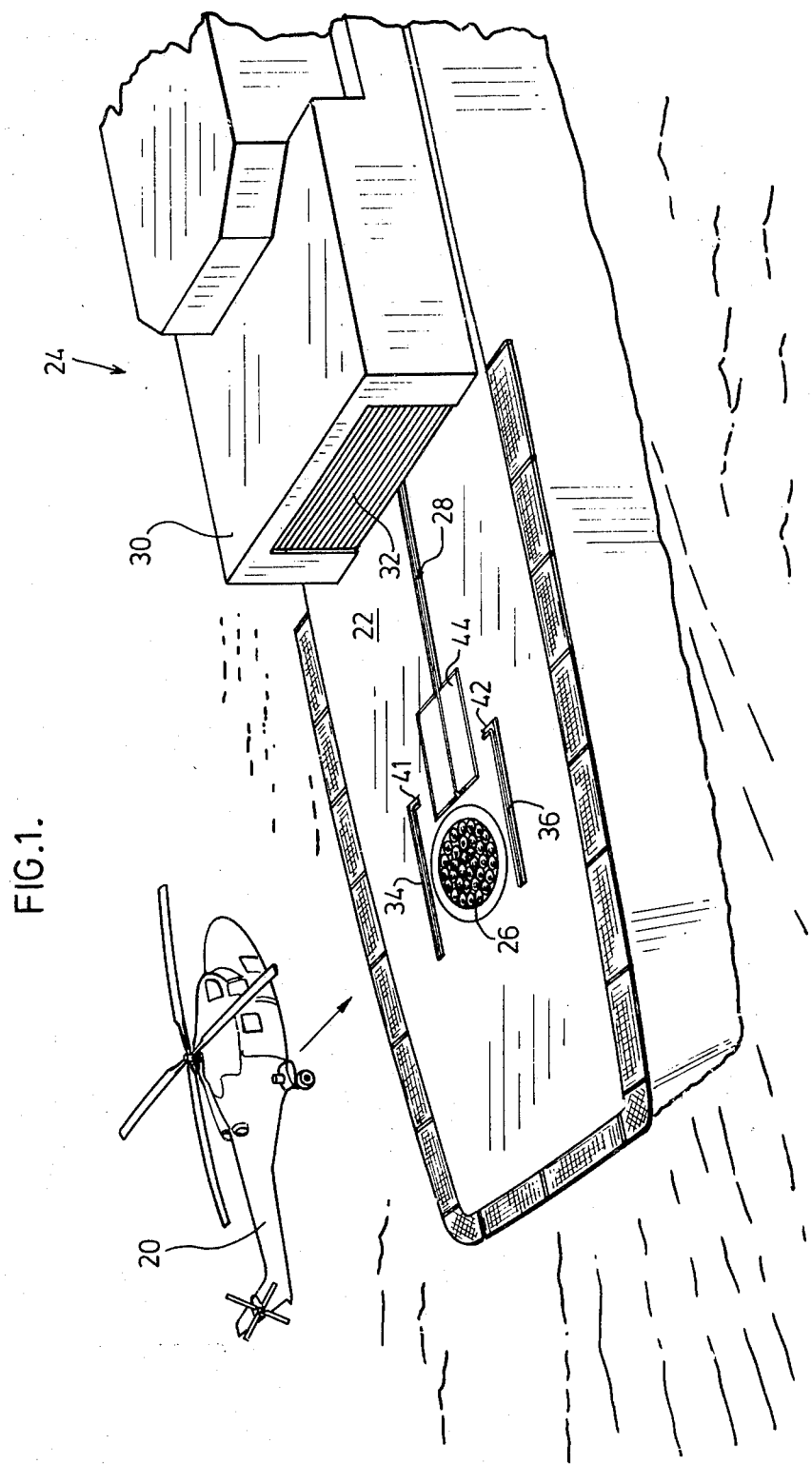
FIG. 1 is a perspective view of a Westland Sea Lynx Helicopter attempting to land on a deck at the rear of a Frigate.
Figure 2:
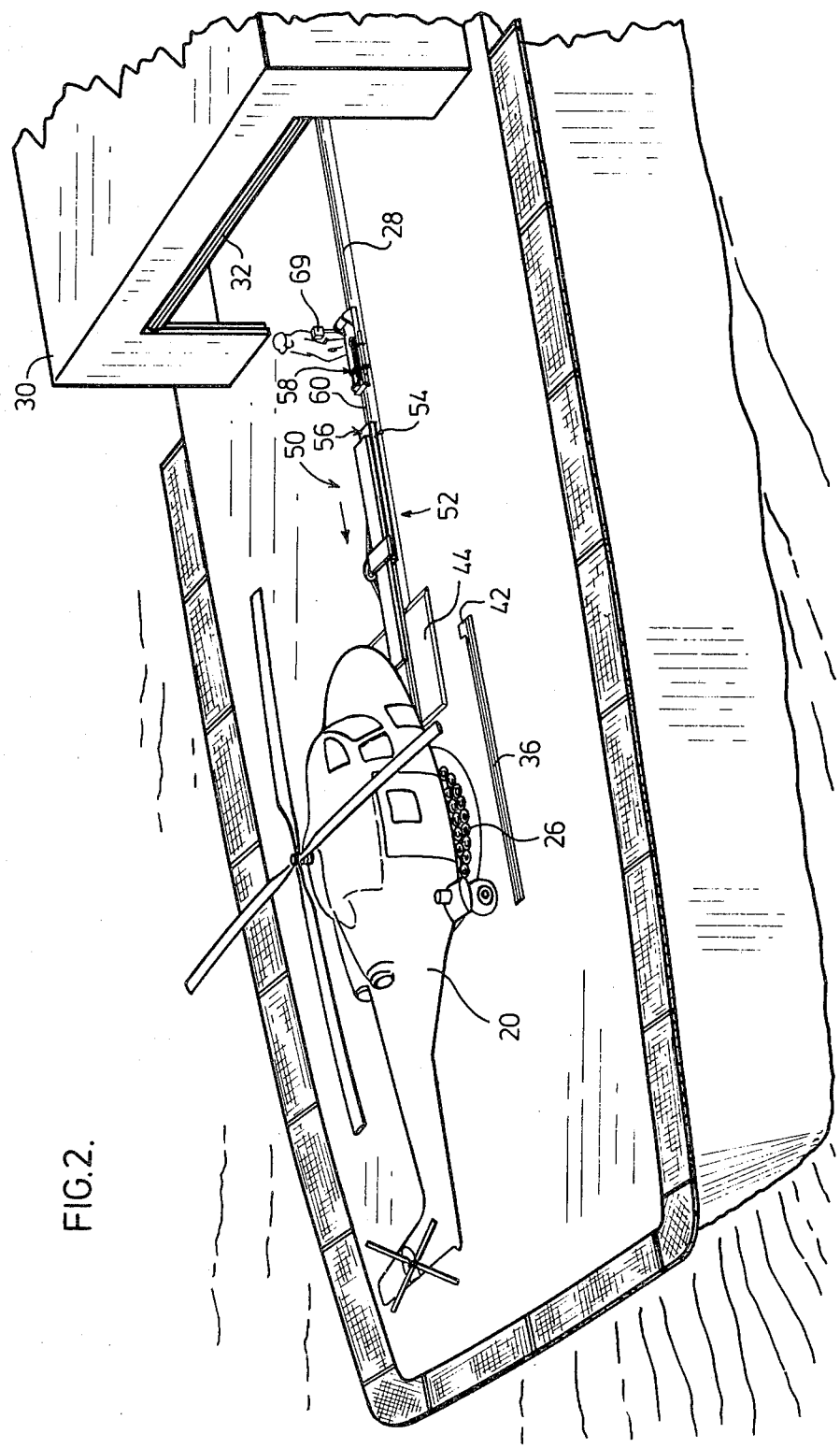
FIG. 2 is a perspective view of the Westland Sea Lynx Helicopter of FIG. 1 having landed on board the frigate and a traversing system being moved towards the Sea Lynx for engagement therewith, according to a preferred embodiment of the inventions.
Figure 3:
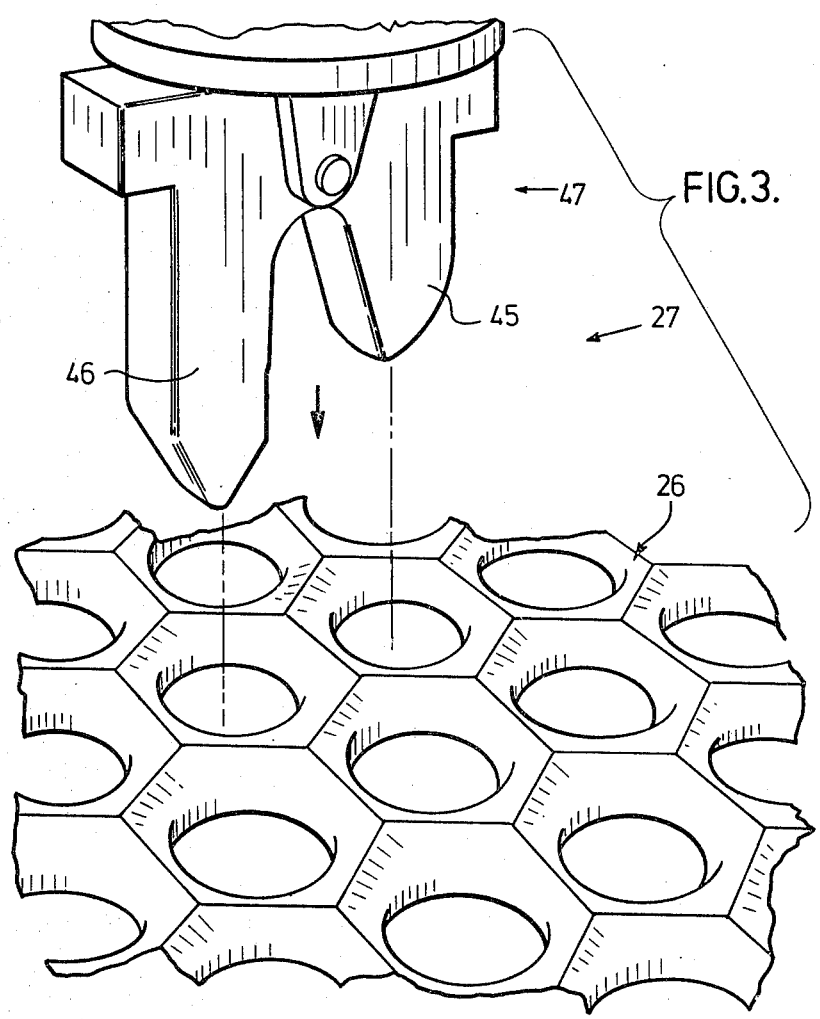
FIG. 3 is a close-up perspective view of part of the hydraulically operated harpoon of the deck lock system employed to secure the Sea Lynx of FIG. 2 to the ship deck.
Figure 4:
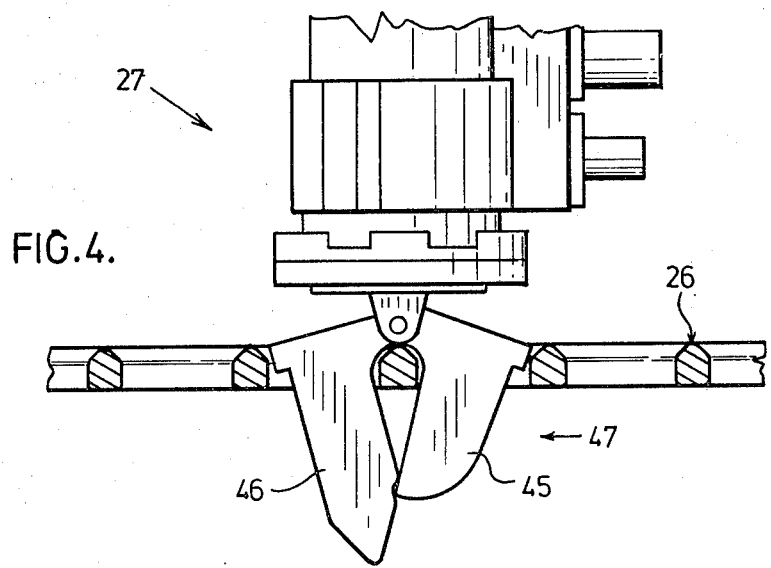
FIG. 4 is a side view of the deck lock system shown in FIG. 3 engaged.
Figure 5:
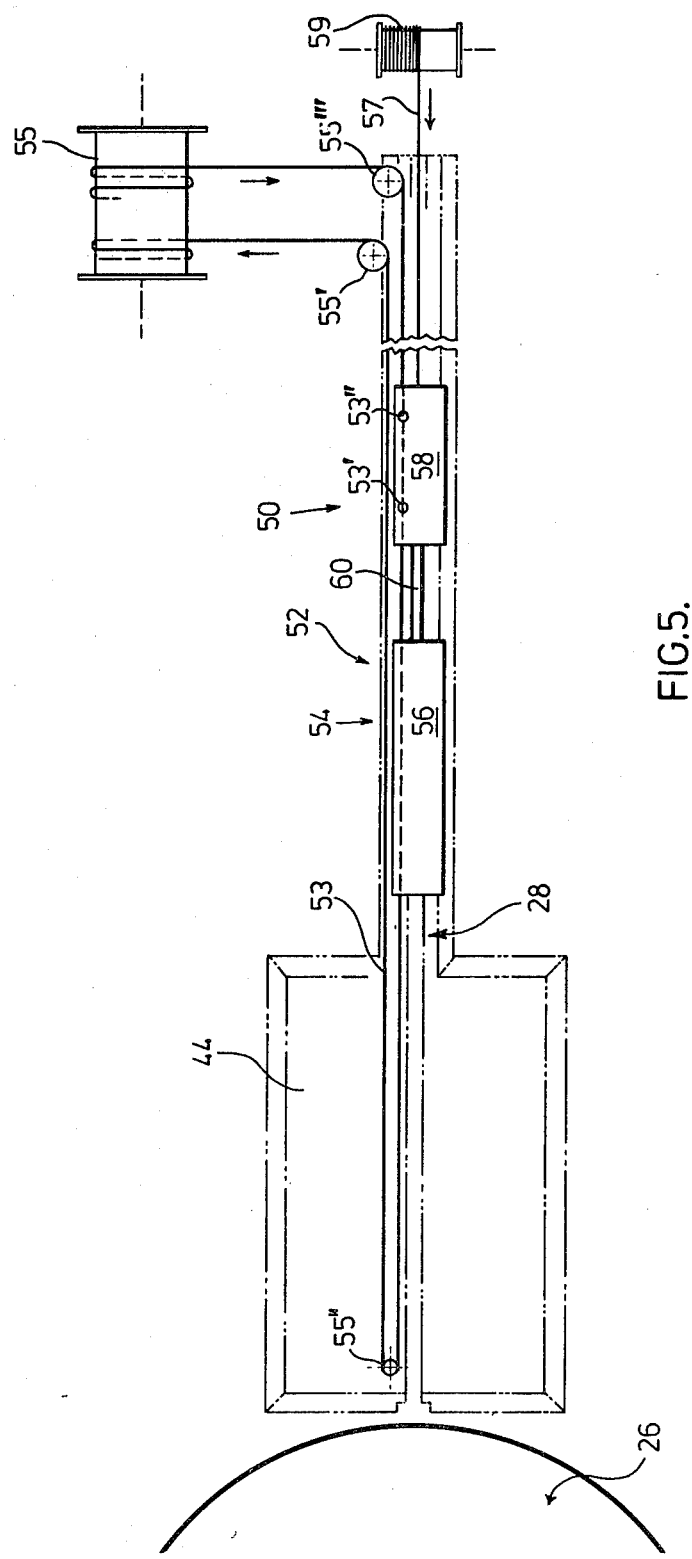
FIG. 5 is a top plan view of the traversing system shown in FIG. 2.

With reference to FIG. 1 there is shown a Westland Sea Lynx Helicopter 20 approaching the deck 22 situate at the rear of a frigate 24, for landing on deck 22 with the assistance of the passive grid 26 situate at substantially the center of deck 22 employing its harpoon deck lock system 27 shown best in FIGS. 3 and 4. Surface mounted slotted track 28 (Seen best in FIG. 7) extends from passive grid 26 to hangar 30 through hangar door 32. Extending parallel to main track 28 but on either side of passive grid 26 are two slotted surface mounted guide tracks 34 and 36, one being the mirror image of the other. Track 36 is shown best in FIG. 6 and has a main slot 38 leading to passageway 40. Adjacent slot 38 and on the inboard side (closest grid 26) is lip 39 overlying part of passageway 40. Legs 41 and 42 are provided for securing guide tracks 34 and 36 to the deck respectively at one end by fasteners (not shown). A surface mounted pad 44 surrounds track 28 proximate grid 26.

After helicopter 20 has landed on deck 22, the jaws 45 and 46 of hydraulically operated harpoon 47 close (See FIGS. 3 and 4) and secure The Sea Lynx helicopter 20 to the grid system 26 (See Best in FIG. 4). Thereafter, the hangar door 32 is opened, and traversing system 50 of low profile to pass under helicopter 20 is moved along slotted track 28 to position a portion thereof under helicopter 20 for overlying passive grid 26, for securing the Sea Lynx thereto;

With reference to FIGS. 2, 5, 6, 7, 8, 9, 12G and 12P traverser system 50 includes, (See FIG. 5), traverser 52 secured to greased steel cable 53 at 53' and 53" in surface mounted track 28, cable 53 secured for play-out from winch 55 below the slot in track 28 around pulley or sheave 55'" through track 28, around sheave 55" under enlarged surface mounted pad 44 for return around sheave 55' for take-up by winch 55. Traverser 52 is thus moved in track 28 by the play-out and take-up of cable 53 from winch 55. Control of the components of the traverser 52 is provided by electrical cable 57 played out and taken up under tension by means of spring wound cable reel 59 and is dragged along the floor or trough of the track 28 as the traverser moves on track 28;

Traverser 52 comprises a base assembly 54, made up of aft base assembly 56, fore base assembly 58, and connector beam 60 secured in main slotted track 28 (Seen Best In FIGS. 6 and 7), cross-beam assembly 62 pivotally secured at 63 to aft base assembly 56, harpoon deck lock carriage 64 (Seen Best In FIGS. 6 and 8) securing retainer 66 (See FIGS. 6 and 12G) providing a "minigrid" of passive grid 26—only three grid holes 67 are provided—and struts 68 of equal length secured to retainer 66. A control box 69 (See FIGS. 2 and 12P) is pivotally secured to fore base assembly 58 for controlling traverser 52. Because the aft base assembly must not interfere with grid 26 when moved under the helicopter, it is supported by connector beam 60 to clear grid 26 with no part touching grid 26.

Figure 6:
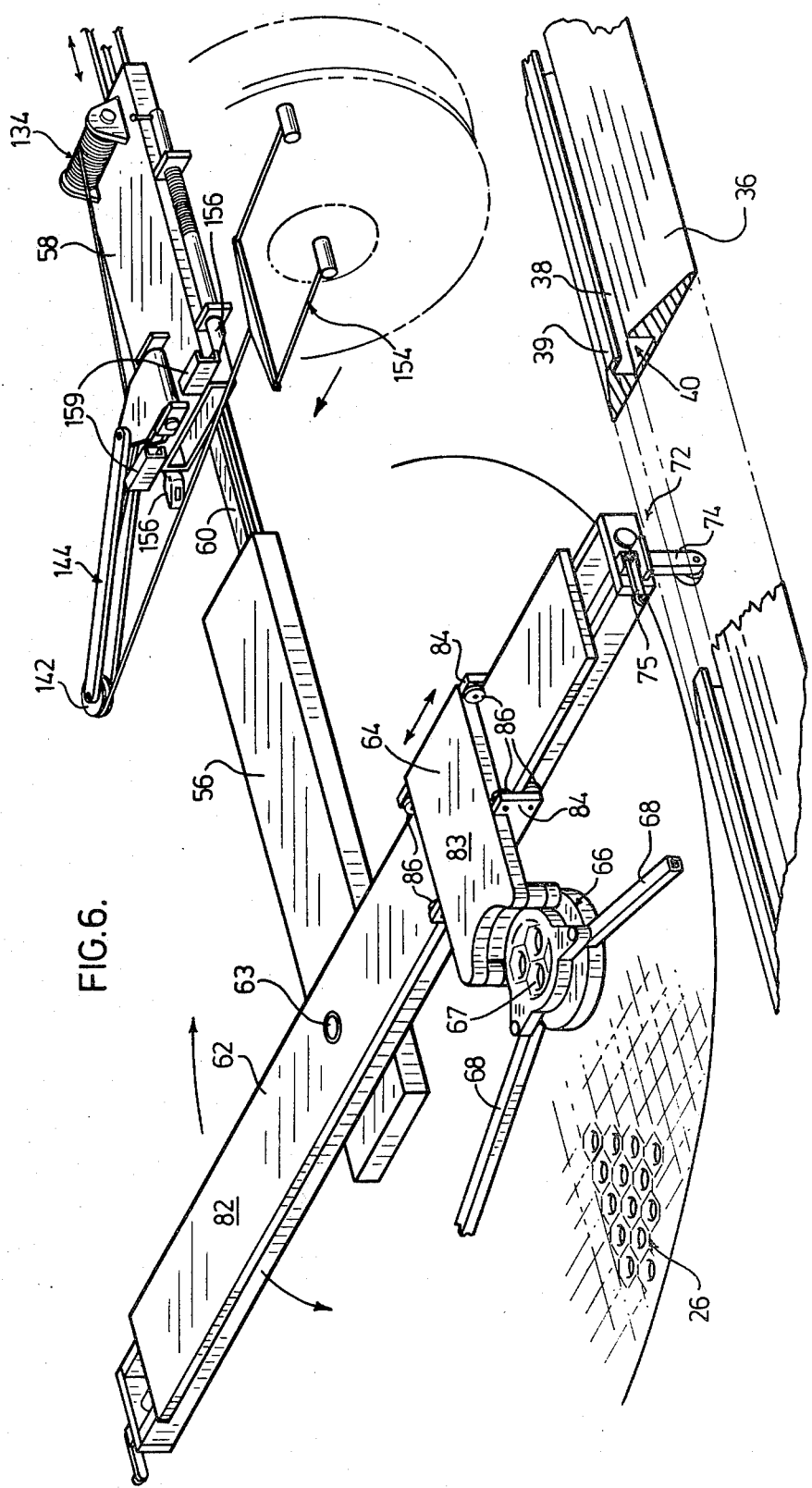
FIG. 6 is a perspective view of the traverser of FIG. 2 in an open position for operation.
Figure 7:
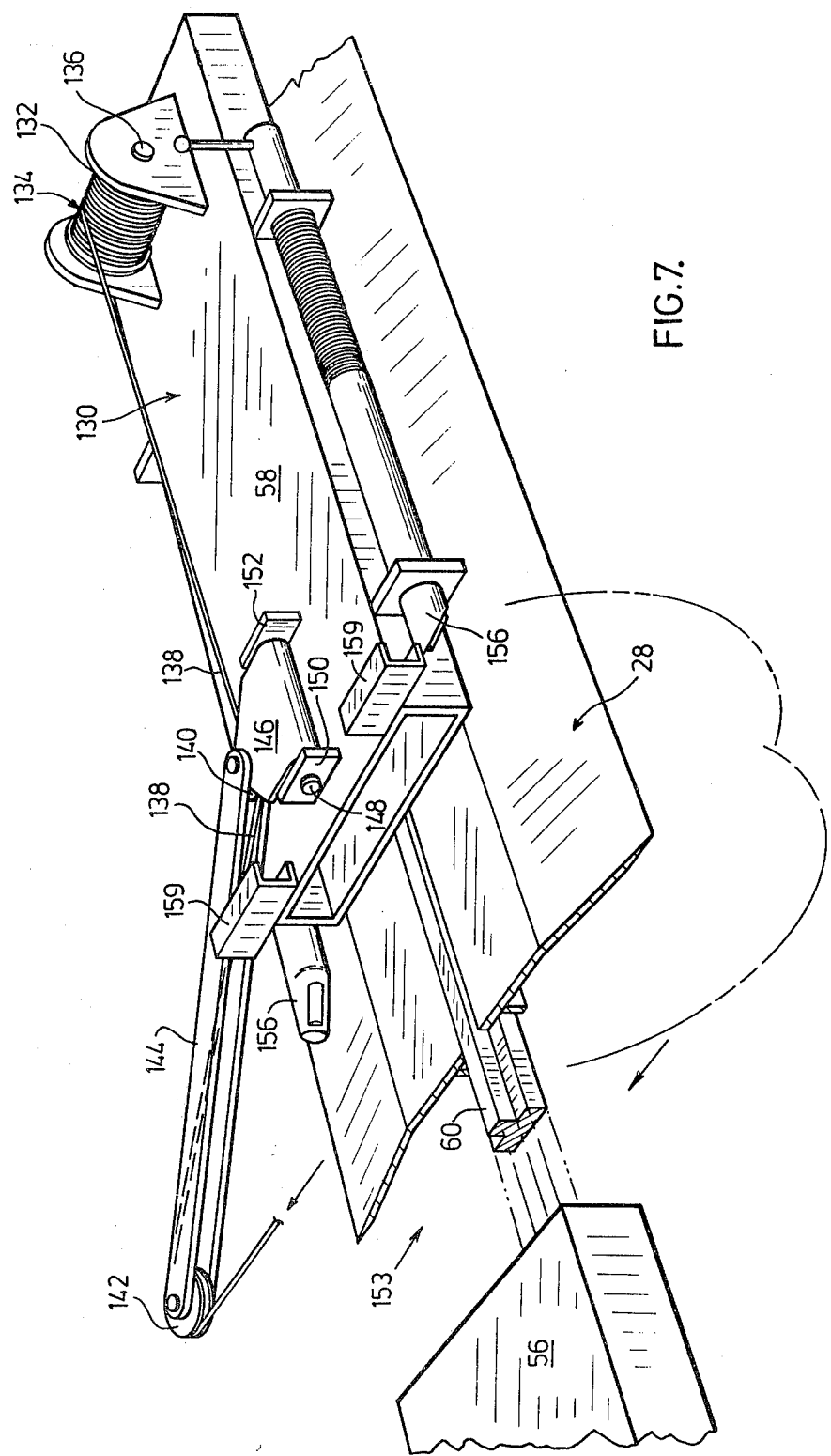
FIG. 7 is a close-up perspective view of part of the traverser shown in FIG. 6.
Figure 8:
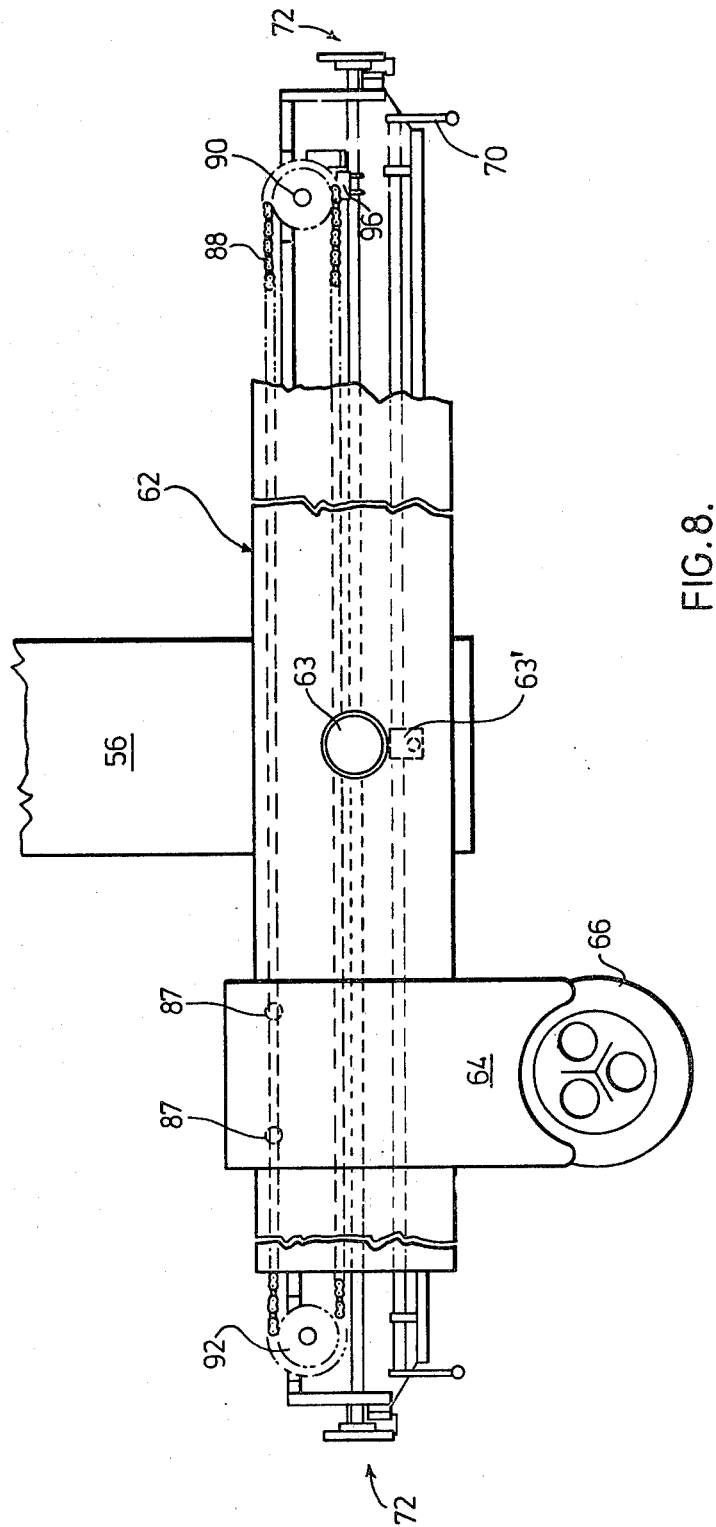
FIG. 8 is a top plan view partly cut-away of part of the traverser shown in FIG. 6.
Figure 9:
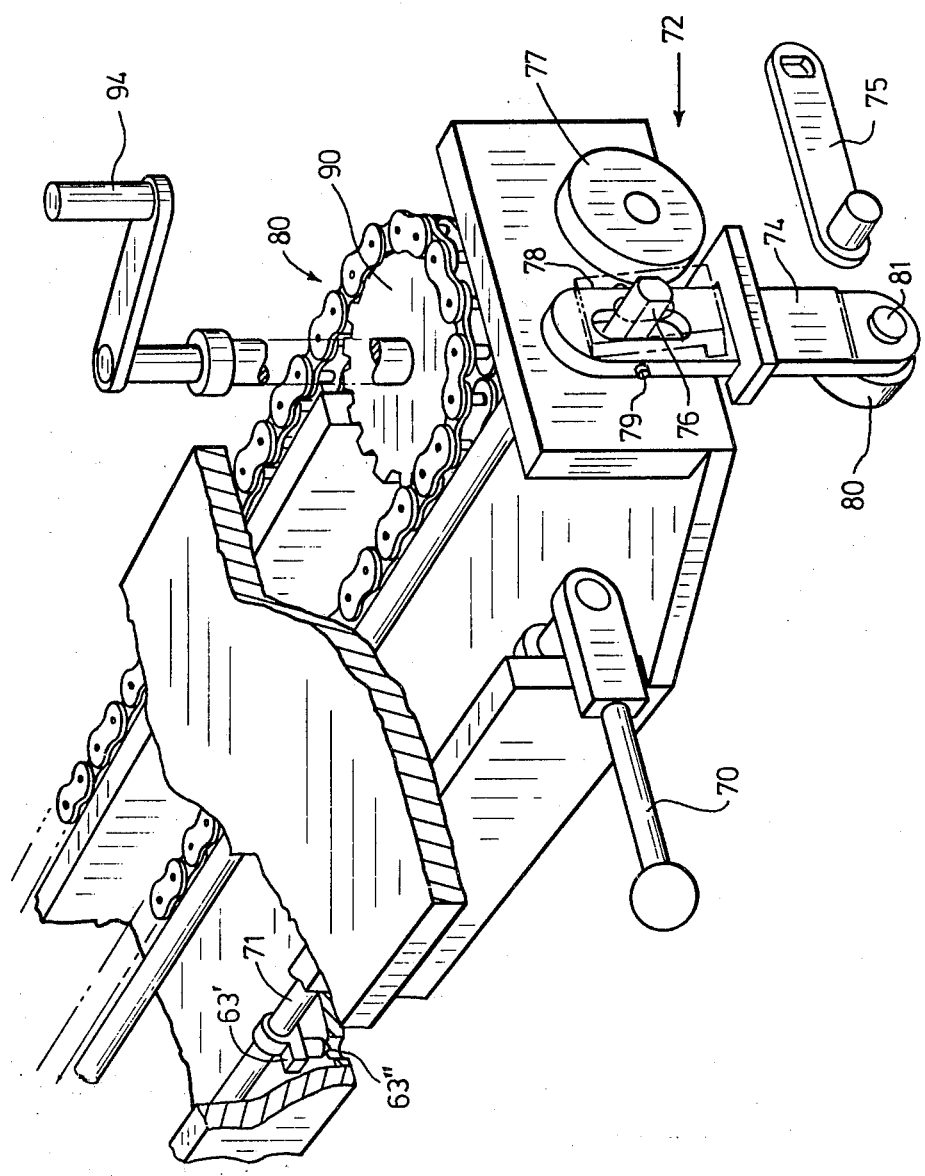
FIG. 9 is a perspective partially cut-away view of part of the structure shown in FIG. 8.

With reference to FIGS. 8 and 9, cross-beam assembly 62 is unlocked for rotation to the position shown in FIG. 8 by rotating lever 70 thereby rotating shaft 71 to remove pin 63' from an aperture 63" (See FIG. 9) in aft base assembly 56. When rotated, cross-beam assembly 62 has been pivoted to a position at substantially right angles to aft base assembly 56 as shown in FIG. 6 and spans the distance between tracks 34 and 36. At either edge of cross-beam assembly, identically structured restrainers 72 are provided for locking into tracks 34 and 36.

Figure 10:
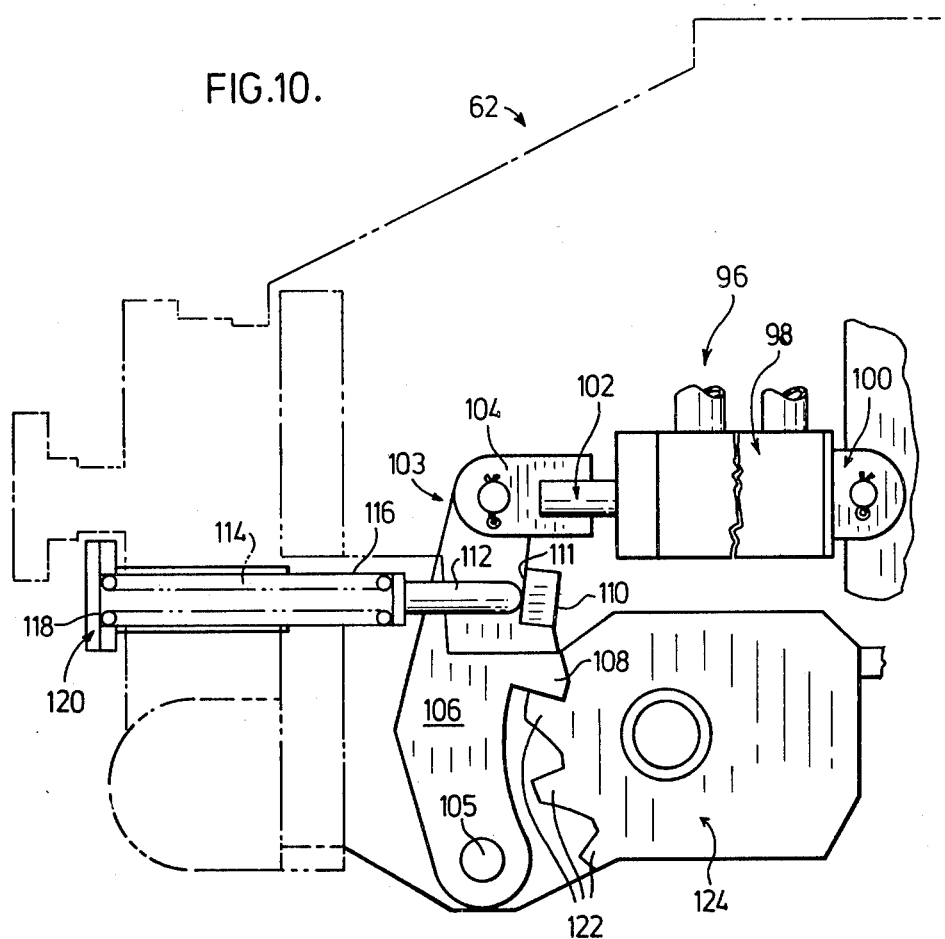
FIG. 10 is a top plan view of the brake system shown in part in FIG. 8.
Figure 11:
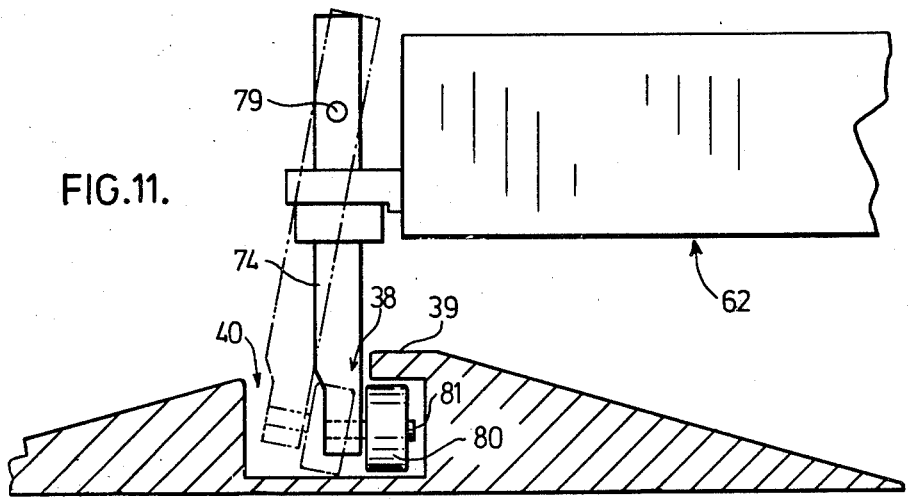
FIG. 11 is a side view of the operation of part of the structure shown in FIG. 9.
Figure 12A:
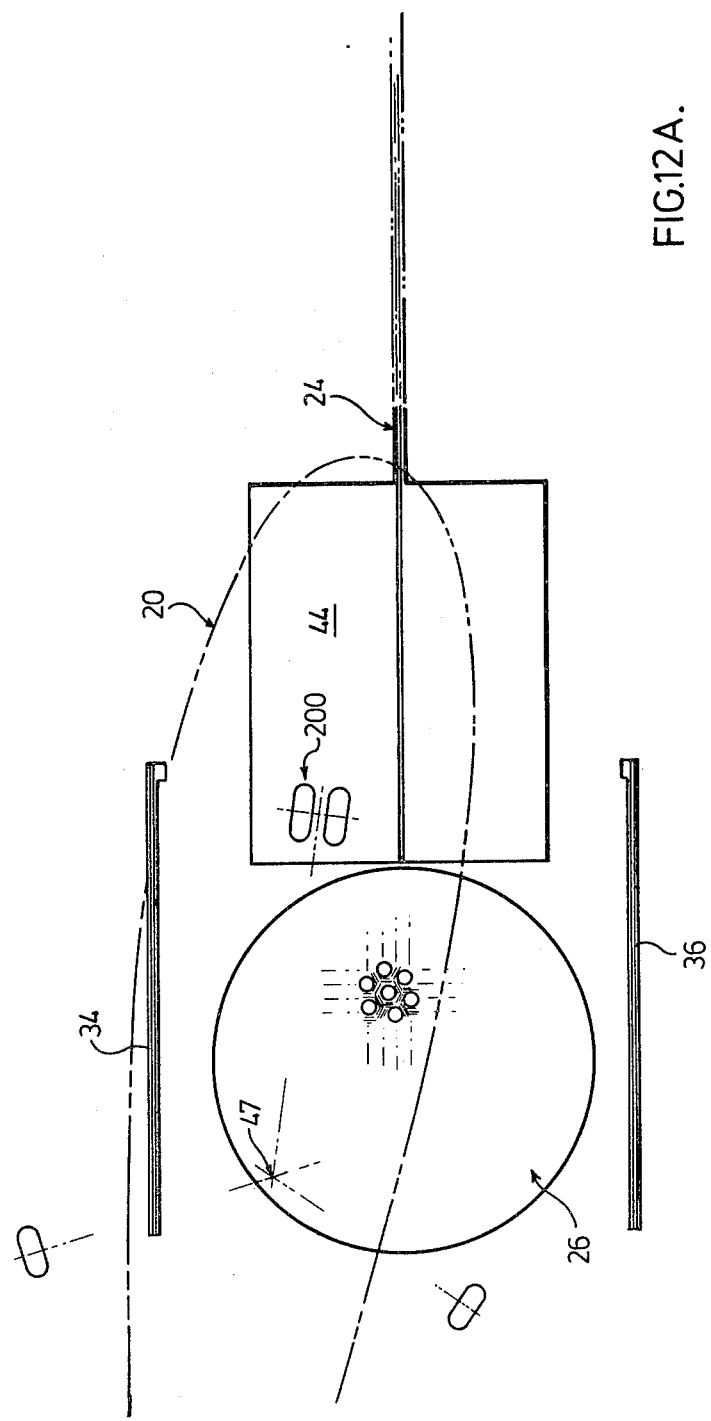
FIGS. 12A to 12J and 12L to 12P illustrate diagrammatically a method of securing the Sea Lynx Helicopter to the traverser and withdrawing the helicopter to the hangar for storage.
Figure 12:
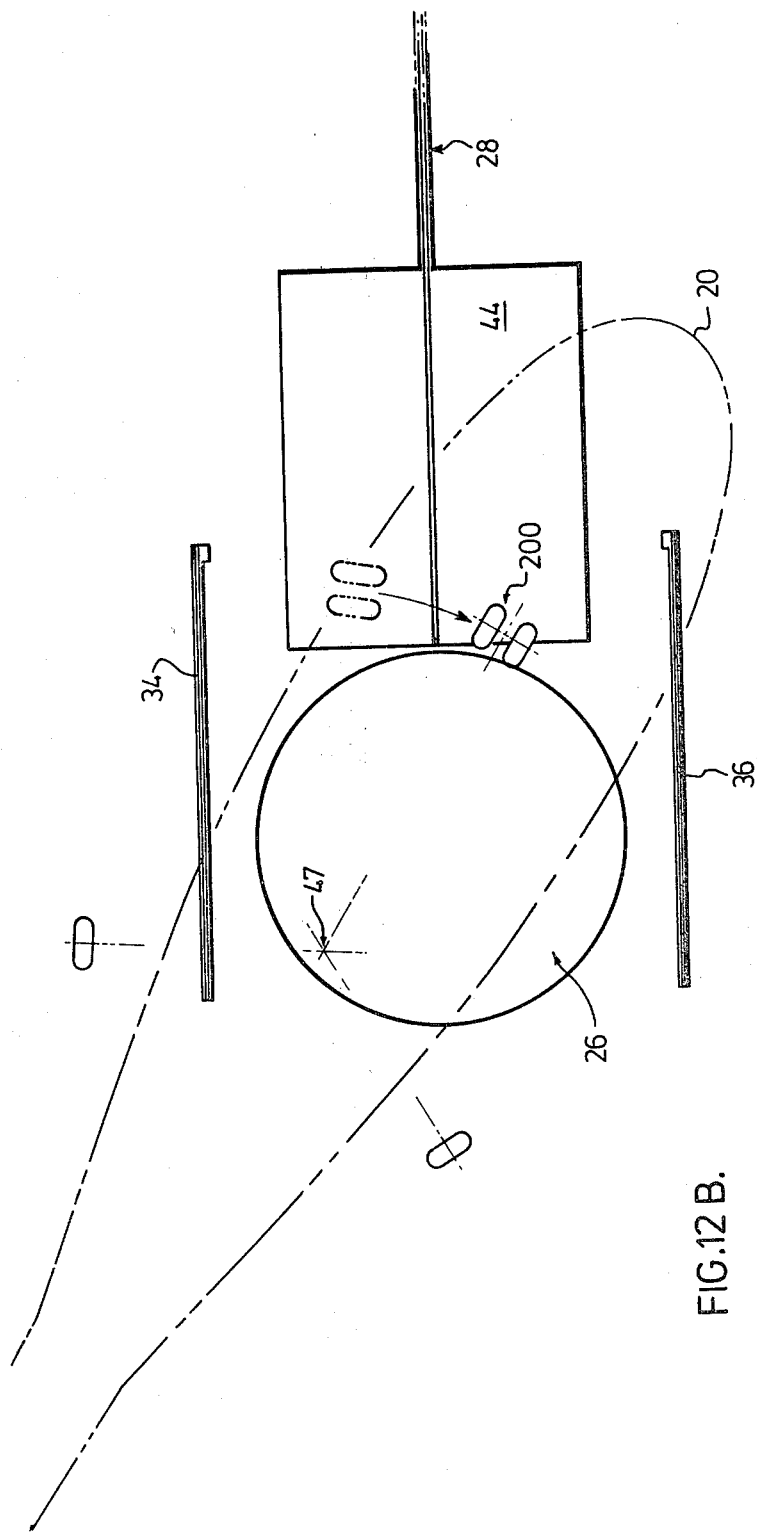
Figure 12E:
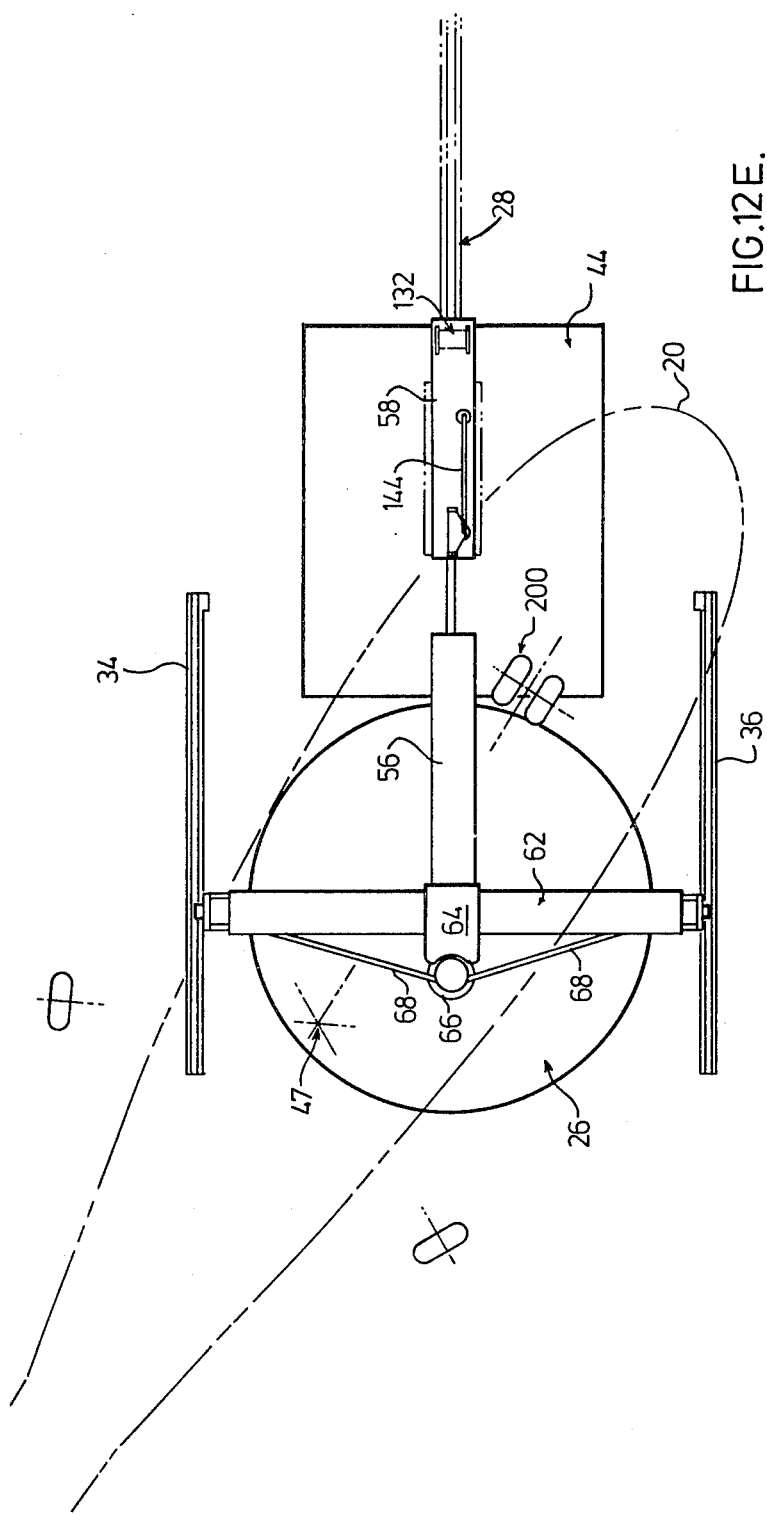
Figure 12F:
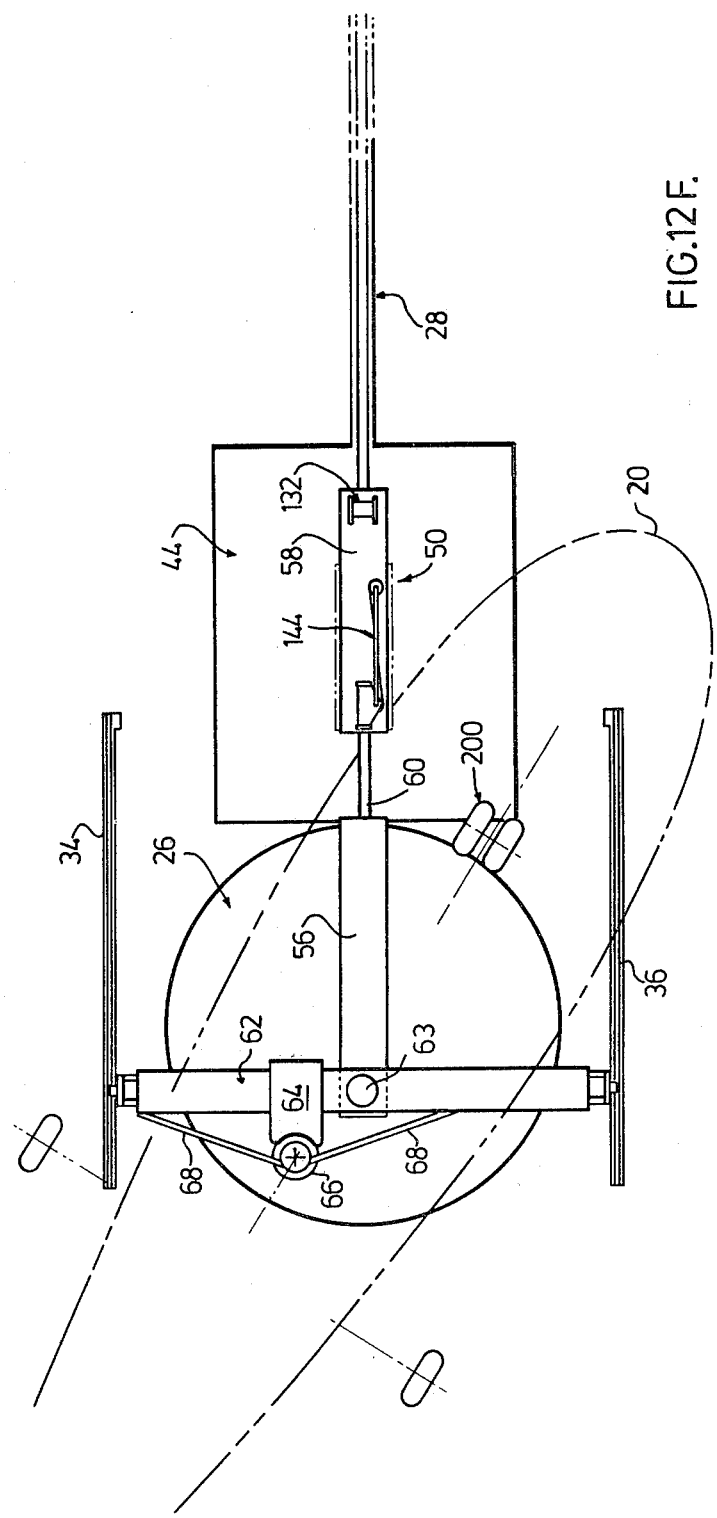
Figure 12:
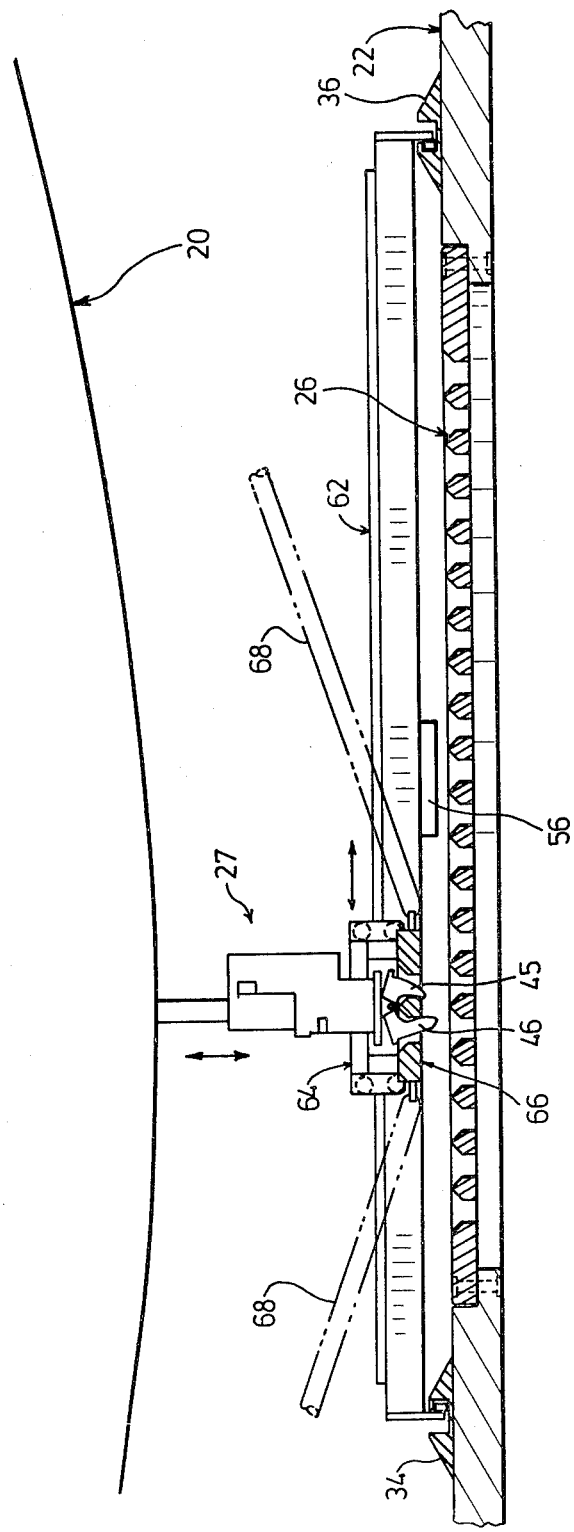
Figure 12:
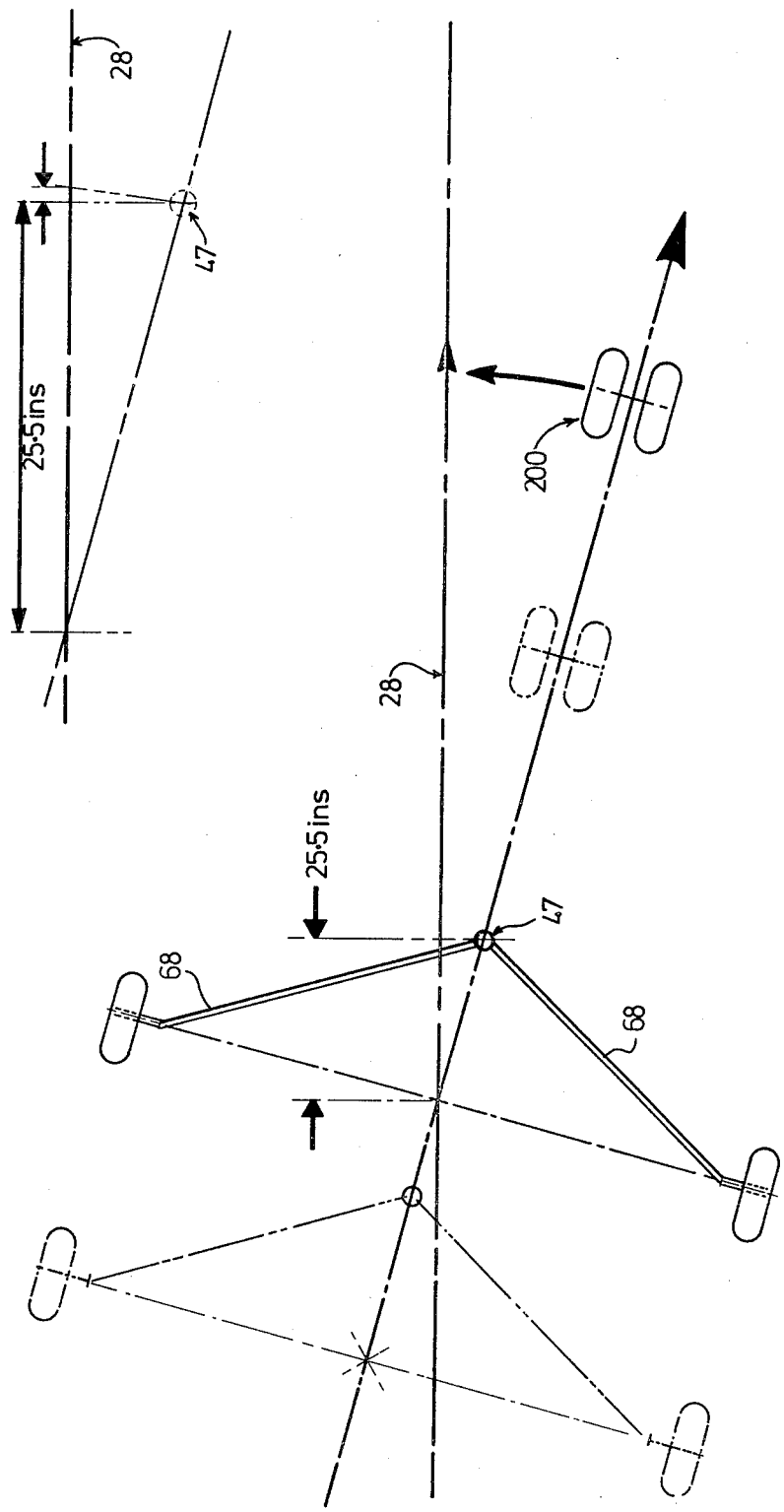
Figure 12J:
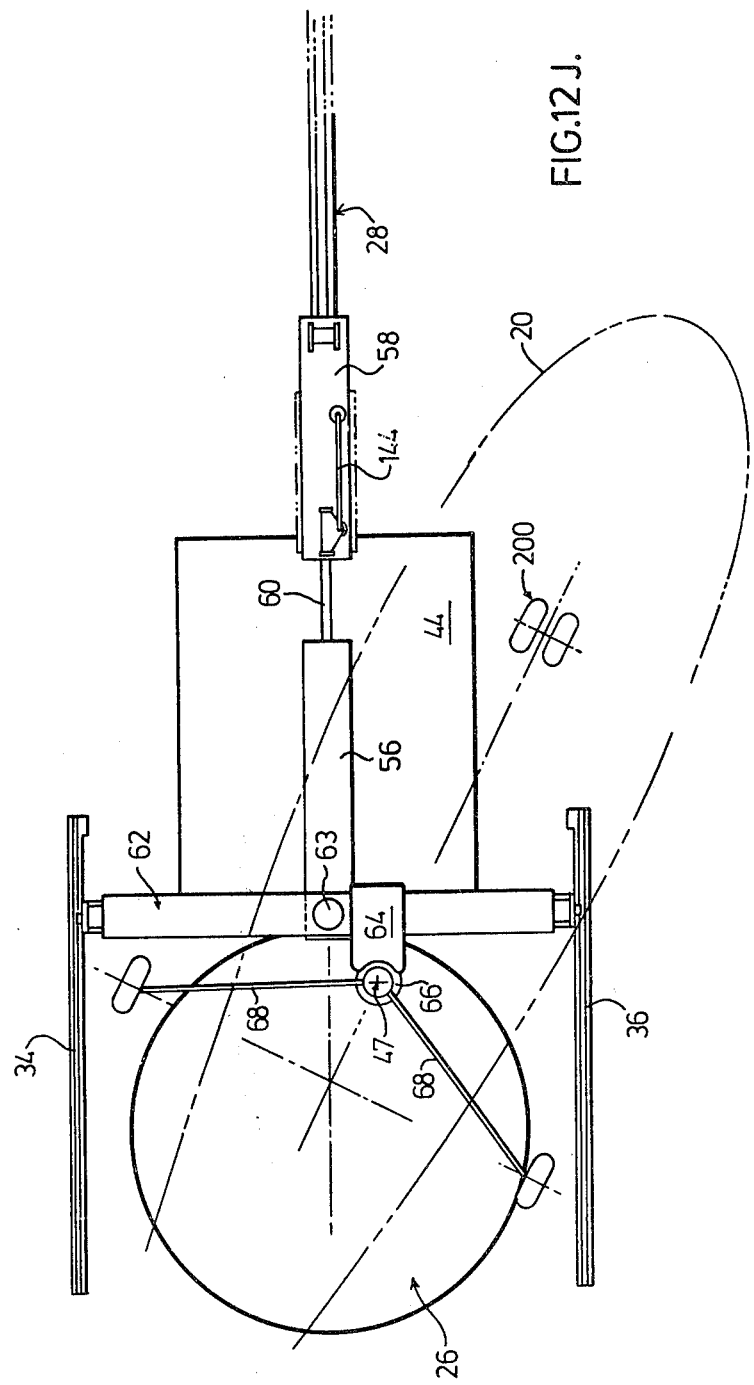

With respect to FIGS. 9, 11 and 12J, each of restrainers 72 comprises a leg 74 (Seen Best in FIGS. 6 and 9), pivotable (using lever 75 secured to elliptical shaft 76 passing through cross-beam assembly 62 to the other restrainer leg for joint operation of both legs 74) from a position co-planar with cross-beam assembly 62 to a position at right angles thereto so as to extend downwardly into slots 38 (See FIG. 6). Thereafter, by tightening cap 77 extending over plate 78 secured to leg 74, each of legs 74 pivots inwardly on horizontally extending pins 79 (See FIGS. 9 and 11). Rollers 80 are journalled for rotation on shaft 81 and shaft 81 is secured to the lower end of leg 74. Therefore, when each leg 74 is pivoted downwardly and the inwardly on pin 79, rollers 80 first pass through slot 38 of track 34 and 36 into passageway 40 and then under lip 39 so that upward movement of each roller 80 is precluded by lip 39;

Cross-beam assembly 62 comprises a rectangular housing covered by plate 82 which overhangs the housing at its side (See FIG. 6) for securing harpoon decklock carriage 64 thereto;

Harpoon deck-lock carriage 64 comprising plate 83 is secured to, roller bearing assemblies 84 having roller bearings 86 which ride on the upper and under surface of the overhangs of plate 82, and at 87 (See FIG. 8) to an endless chain drive 88 (See FIGS. 8, 9 and 10) in cross-beam assembly 62, entrained about cog wheels 90 and 92. Chain drive 88 is free wheeling so as to slide whenever braking system 96 (hereinafter described) is released, can be moved by turning cog wheel 90 by crank 94 (See FIG. 9) keyed into cog wheel 90 (when brake system 96 is not applied) and can be stopped by applying braking system 96 (Seen Best In FIG. 10);

Braking system 96 is housed in cross-beam assembly and comprises pneumatic cylinder 98 rigidly secured at 100 at one end and at the other to drive shaft 102 outwardly to drive plate 104 away from pneumatic cylinder 98. Plate 104 is in turn secured to one end 103 of arm 106 which arm is pivoted at its other end 105. Arm 106 also supports one cog 108 and an angled rectangular block 110 upstanding from the face of arm 106. Seated against angled face 111 of block 110 is a projection 112 forced against face 111 by compression spring 114 supported in housing 116 closed at end 118 by cap 120. Cog 108 is positioned relative to cog wheel 124 to mesh with cogs 122 of cog wheel 124 whenever the braking system is applied. Cog wheel 124 is journalled for rotation on the same shaft as cog wheel 90. Normally shaft 102 is withdrawn into pneumatic cylinder thereby causing cog 108 to be meshed with cogs 122 of cog wheel 124 because projection 112 is constantly urging block 110 and thus cog 108 towards cog wheel 124. When the brake is to be disengaged, pneumatic cylinder is activated, pushing shaft 102 outwardly pushing plate 104 away from cylinder 98. Because arm 106 is secured to plate 104 and is pivoted at 105, block 110 is angularly pivoted away compressing spring 114. At that time, cog 108 is disengaged and chain drive is free to move carriage 64. Therefore, should the pneumatic cylinder 98 ever fail, the brake is automatically set;

Connecting aft base assembly 56 with aft base assembly 58 is interconnector beam 60 positioned within slot 90 of main track 28 (See FIG. 7) and is of a predetermined length greater than the diameter of the nose wheels of the Sea Lynx Helicopter. It will also be noted that the upper part of interconnector beam sits above the upper extent of the track. Therefore, since the upper part of the beam is connected to the lower part of the aft and fore base assemblies 56 and 58, a clearance is provided between the track and base assemblies 56 and 58. Since the upper part of track 28 is above grid 26, a clearance exists between grid 26 and aft base assembly 56 when aft base assembly is positioned over grid 26 to secure the harpoon.

Fore base assembly 58 includes a low profile base portion 130, mounting a low profile winch 132, supporting pulley sheave 134 journalled for rotation on supported shaft 136.

Cable 138 from winch 132 is secured over pulleys 140 and 142 of gantry 144. Gantry 144 is secured to U-bracket 146 pivotable in the vertical direction about pin 148, secured through members 150 and 152. Therefore gantry 144 can be positioned to project from either the port or starboard side of the aft base assembly 58, to be positioned beside recess 153 formed between assemblies 56 and 58. At the end of the cable 138 is a snare device (See FIG. 6) for attaching to the hub of the nose wheel so that when the wheel is secured to the snare and cable 138 taken up, the nose wheel is drawn into the recess. To ensure the gantry is not pulled into the recess, stops 159 are provided on either side of fore base assembly 58 respectively for fixing to the outer edge of the nose wheels when positioned in recess 153;

TRAVERSING OF THE SEA LYNX (SEE FIG. 12A TO FIG. 12P)

Figure 12M:
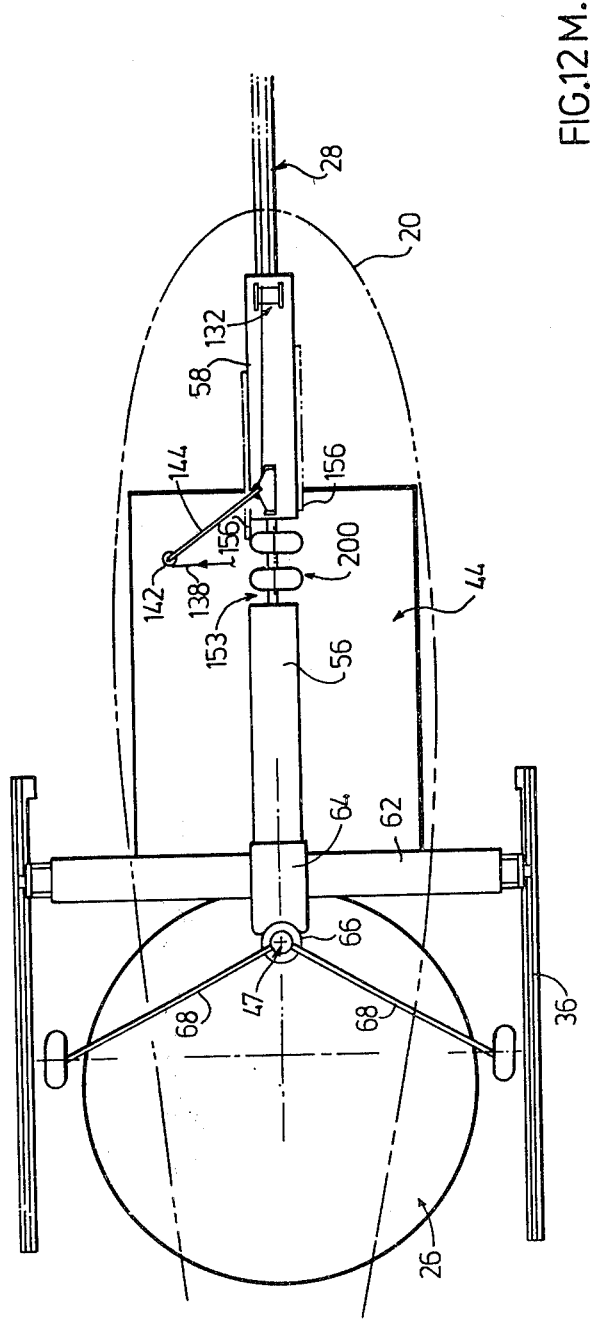
Figure 12:
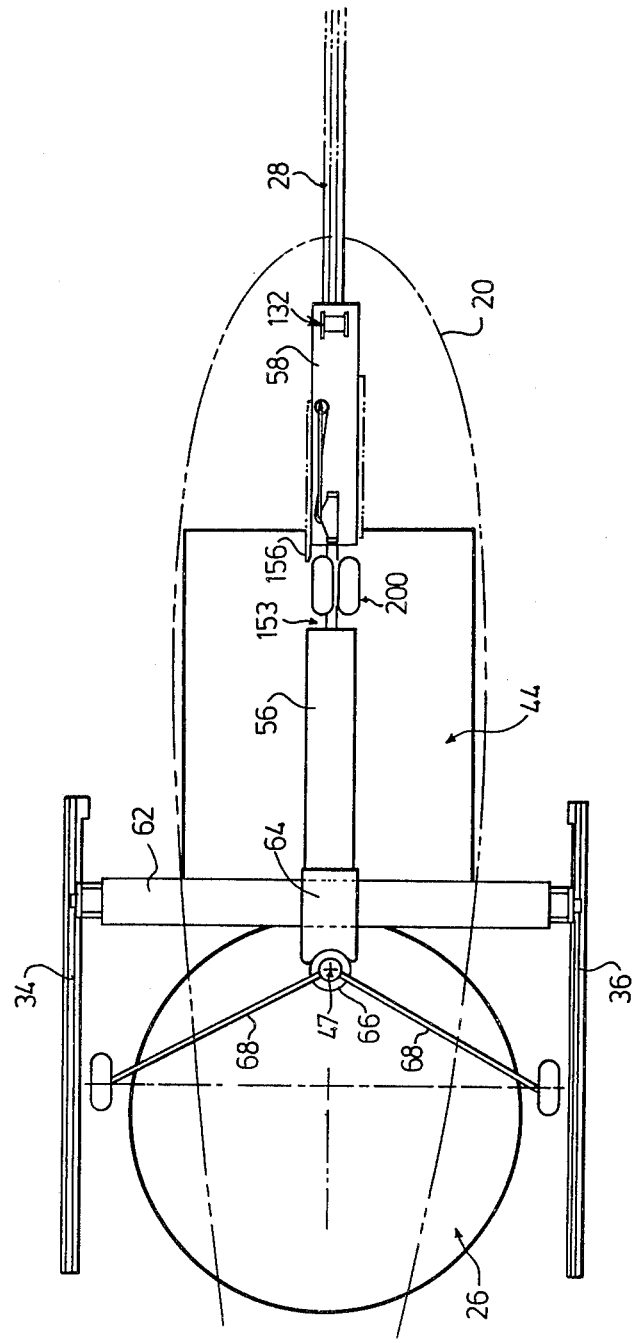
Figure 12P:
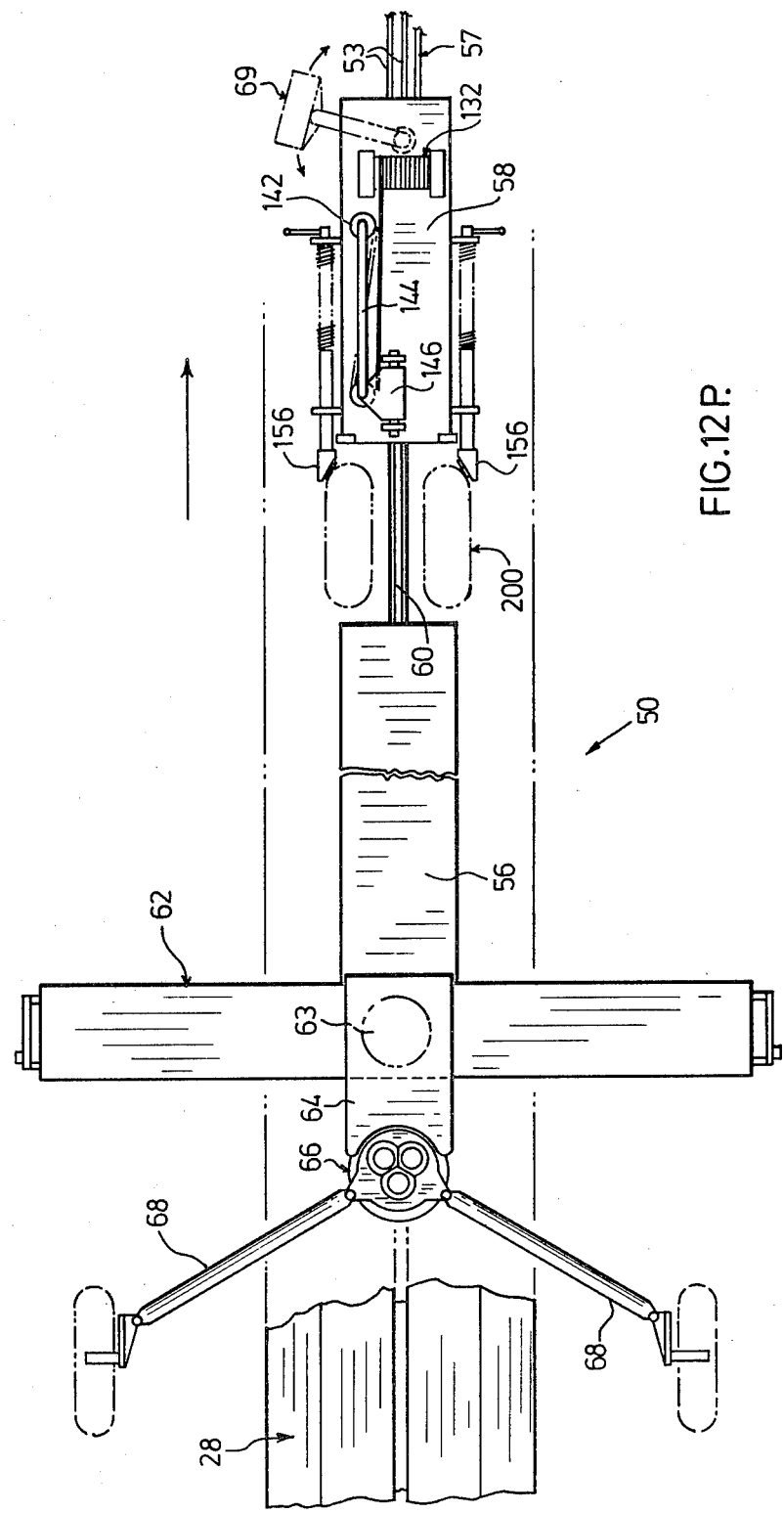

FIGS. 12A to 12P inclusive represent schematically the use of traversing system 50 for traversing the Sea Lynx from its landing position to the hangar. Since these figures are merely schematic, only those components essential to the understanding of the method of traversing have been included so as not to clutter the drawings;

With reference to FIG. 12A, the Sea Lynx Helicopter 20 has landed with the harpoon 47 in the aft port quadrant of grid 26 with the helicopter nose pointed to starboard and nose wheel 200 on pad 44 on the port side of main slotted track 28;

With reference to FIG. 12B, the pilot has been requested by the aircraft handler stationed at controls 69 to rotate the Sea Lynx nose wheel to starboard past track 28 and then to shut down the engines;

If necessary, the helicopter is secured by deck tie-downs at this point. Nose wheel 200 is then aligned to point in the direction of the helicopter;

With reference to FIG. 12C, the folded traverser 52 has been moved aft along slotted track 28 to a position under the helicopter with the aft base assembly 56 supported above the track and extending over grid 26 without any contact with grid 26. It should be noted that carriage 64 is pointed to port so as not to interfere with nose wheel 200. If the Sea Lynx had landed with the harpoon in the aft starboard quadrant of grid 26, nose wheel 200 would have been moved to the port side of main slotted track 28 and the traverser would have been moved under the helicopter with the carriage 64 pointing to the starboard side so as not to interfere with the nose wheel 200;

With reference to FIGS. 12D and E, locking pin 63' securing the cross-beam assembly co-planar with the aft base assembly 56 is rotated by lever 70 and cross-beam assembly 62 pivoted so that the restrainers 72 overlie slots 38 of auxillary tracks 34 and 36 respectively, and legs 74 are pivoted downwardly by lever 75 so that the rollers 80 lie within the track and screw caps 77 are tightened to force the rollers 80 inwardly (Seen Best In FIG. 9);

To indicate the restrainers are in place, a metal flag may be automatically raised;

The traverser is then moved further aft (See FIG. 12F) and the deck lock carriage released by releasing brake system 96 to permit carriage 64 to move along cross-beam assembly 62 by rotating chain drive 88, until carriage 64 is opposite the harpoon, secured to grid 26. The harpoon is then hydraulically removed from grid 26 to traverser moved aft a further six to twelve inches and the harpoon inserted through grid 67 in retainer 66 to secure the helicopter to the traverser, (See FIG. 12G). After the Sea Lynx has been secured to the traverser, the aircraft handler inserts the outboard end fittings of the port and starboard stabilizer struts 68 into the inboard axle of the main wheels, (Seen Best in FIG. 12H);

The aircraft handler then releases brake system 96 to permit free wheeling of the carriage on the cross-beam assembly and the combined Sea Lynx Helicopter 20 and traverser 52 are moved forward towards the hangar 30. As the deck lock carriage 64 with the harpoon crosses the mid portion of the cross-beam which is coincident with the slot of the main track, a switch (not shown) is tripped which activates a position predictor (not shown). This event is indicated to the aircraft handler by the flashing of a light in the control panel. The traverser 52 then moves forward an additional 25.5" along track 28 so as to have the mid point between the spaced pair of wheels overlie the slot of track 28. At that point the light becomes steady (not shown) and the deck lock carriage brake 96 and helicopter brakes are applied (See FIGS. 12I and 12J);

With reference to FIG. 12L, nose wheel 200 of the helicopter is then rotated 90° by the aircraft handler now on board the Sea Lynx Helicopter in preparation for alignment. The gantry is then rotated to the port side of the traverser, the means on the end of the cable secured over the gantry is secured to the nose wheel and the nose wheel is winched into nose wheel recess 153. (See FIG. 12M). The nose wheel is then rotated 90° and the chocks 156 secured to engage the nose wheel on either side. Thereafter, the aircraft handler removes and stores the gantry and cable, and moves the helicopter and traverser towards hangar 30 (See FIGS. 12N, 12O and 12P);

Tracks 34 and 36 are open fore, thus permitting restrainers 72 to exit from the slots 34 and 36.

TRAVERSING HELICOPTER FOR TAKE-OFF

Figure 13:
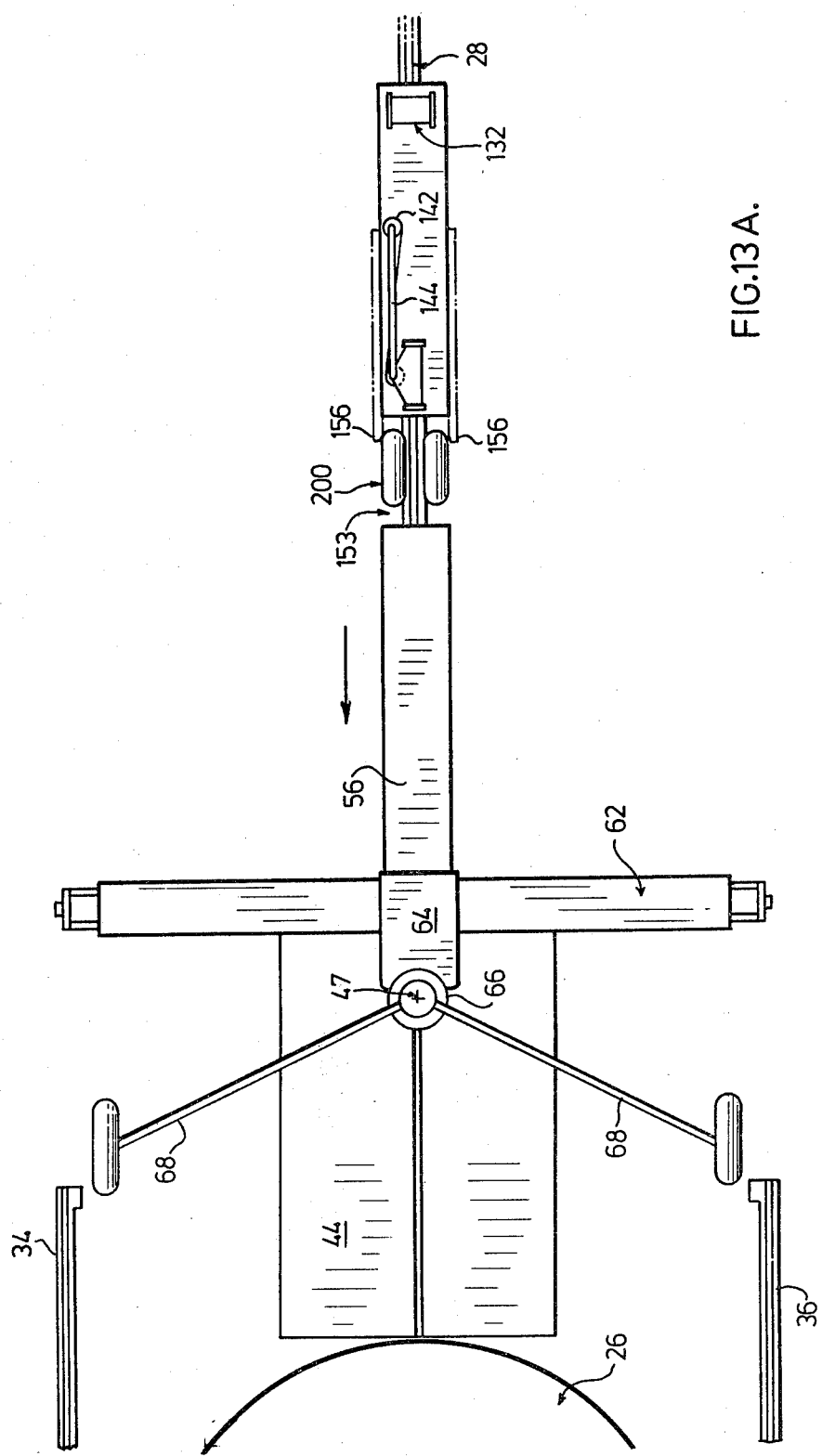
FIGS. 13A to 13G illustrate diagrammatically the moving of the Sea Lynx Helicopter from the hangar to the passive grid prior to the Sea Lynx Helicopter taking off and the partial withdrawal of the traverser.
Figure 13C:
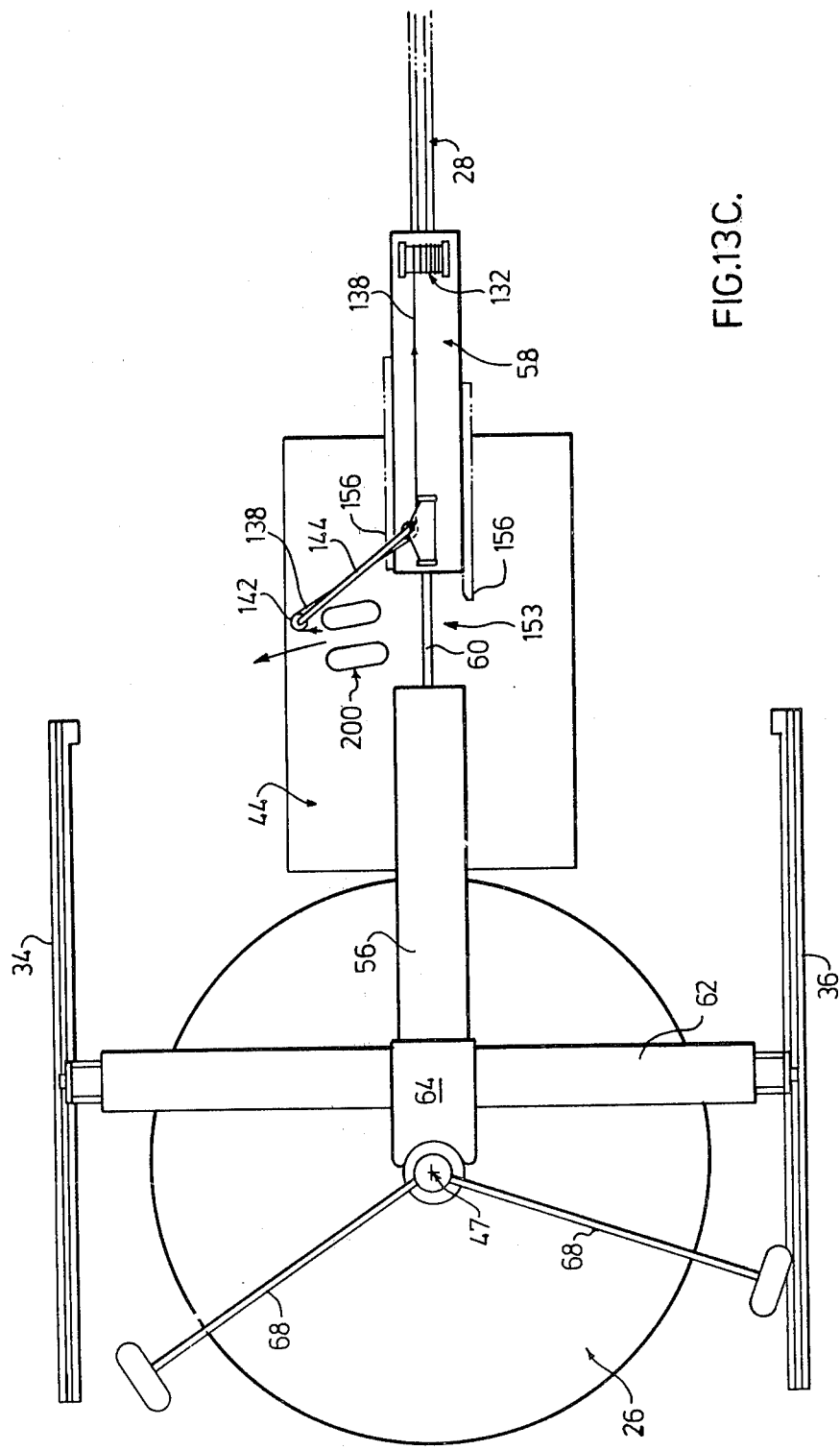
Figure 13D:
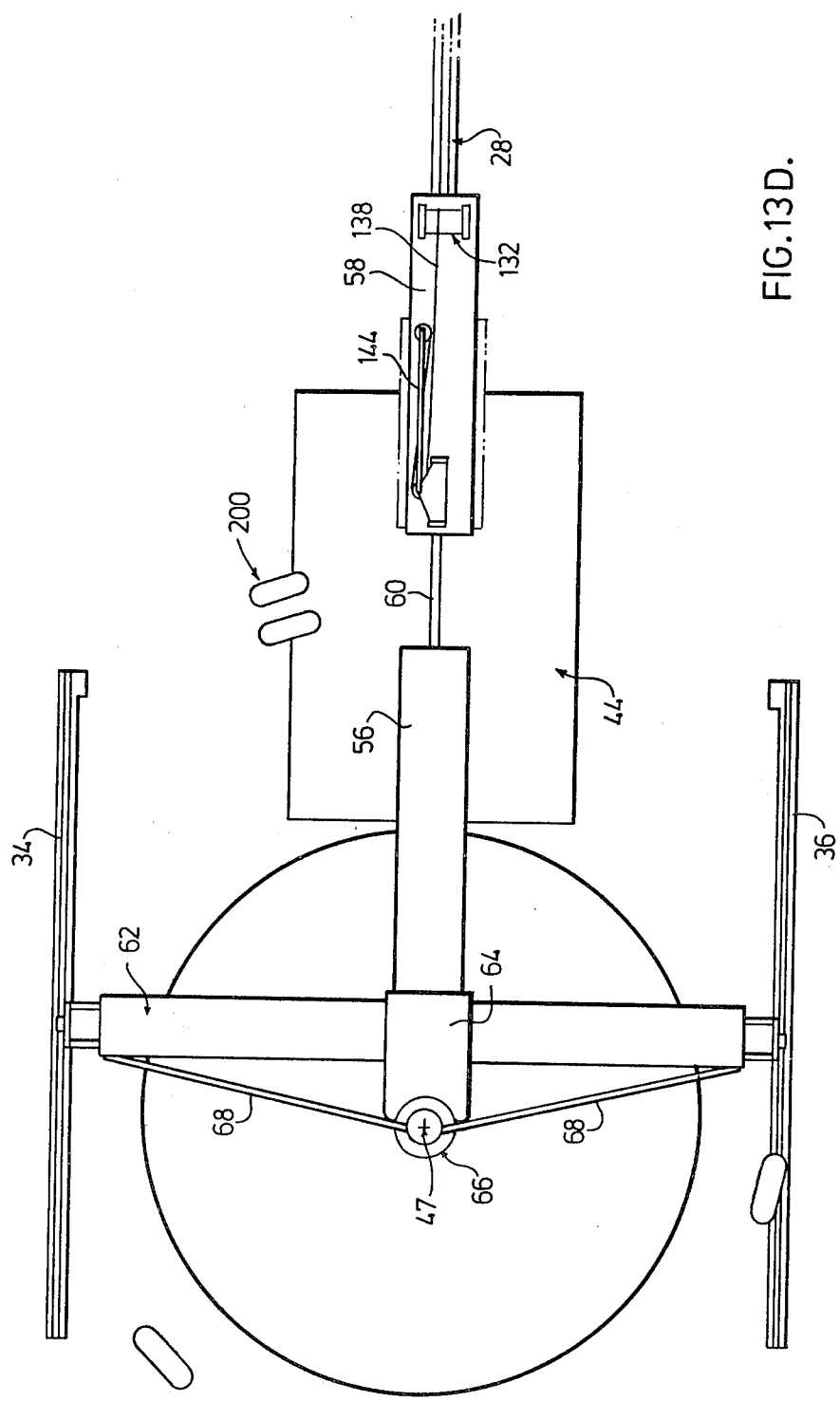
Figure 13E:
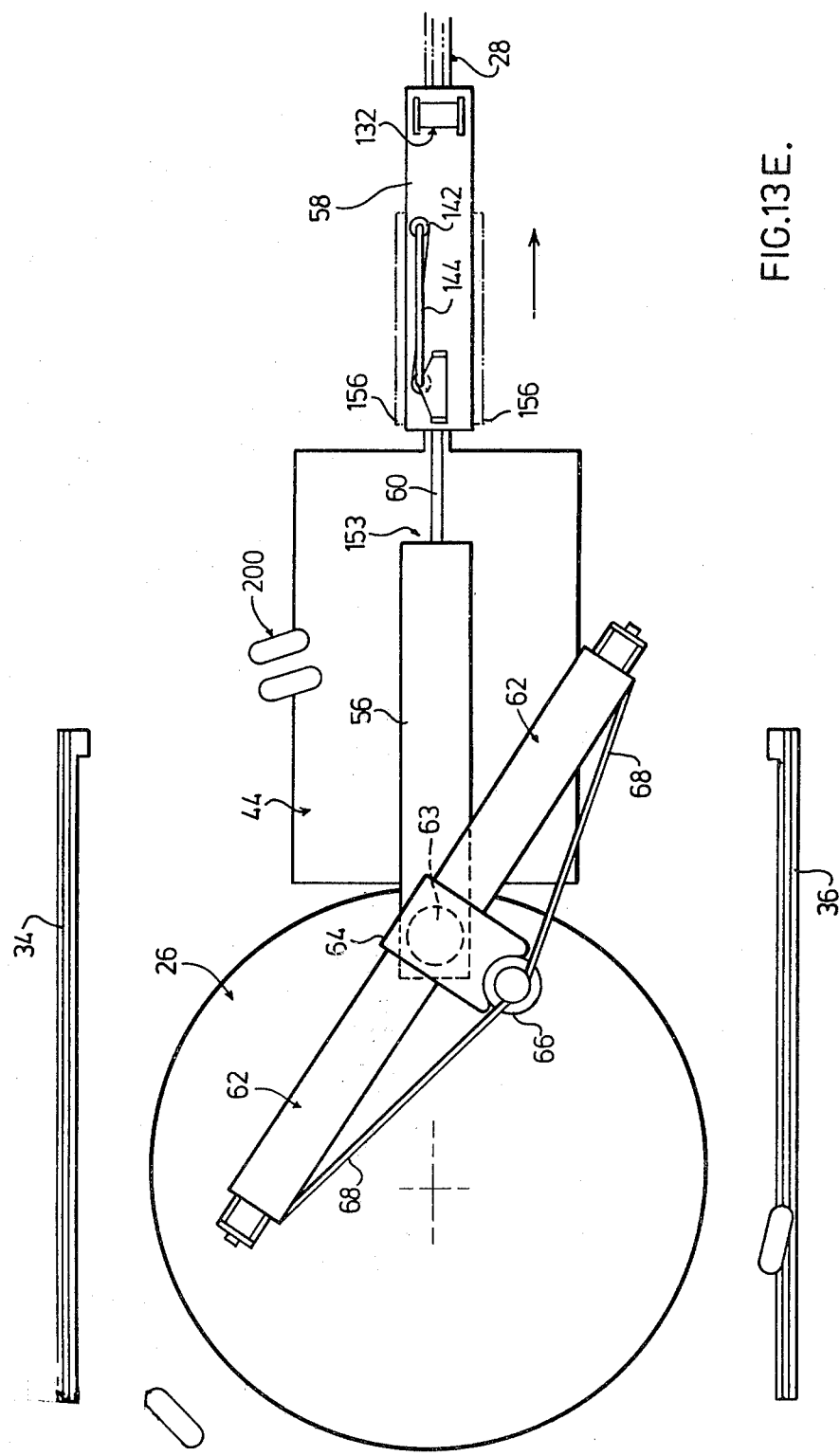
Figure 13:
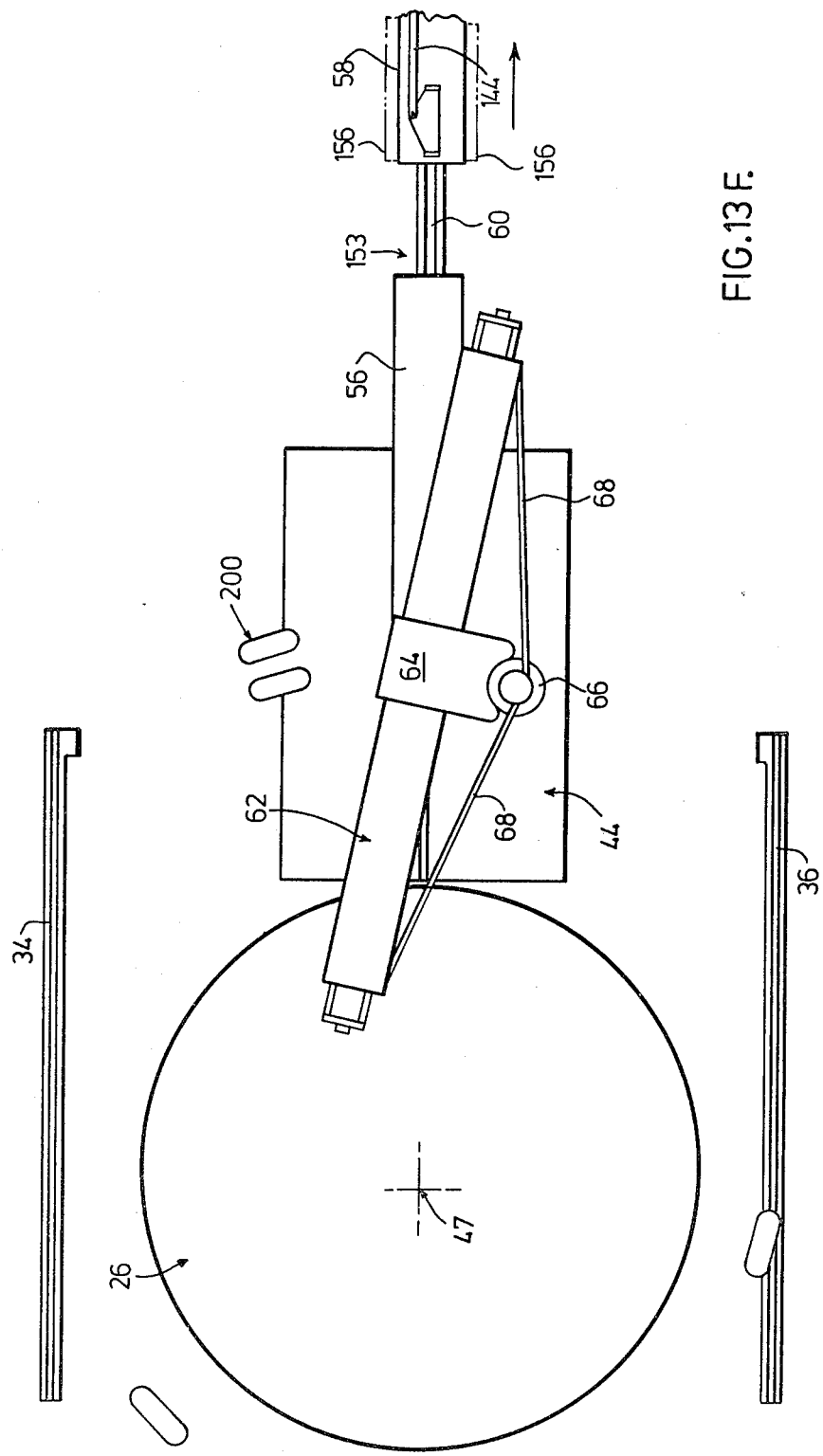
Figure 13:
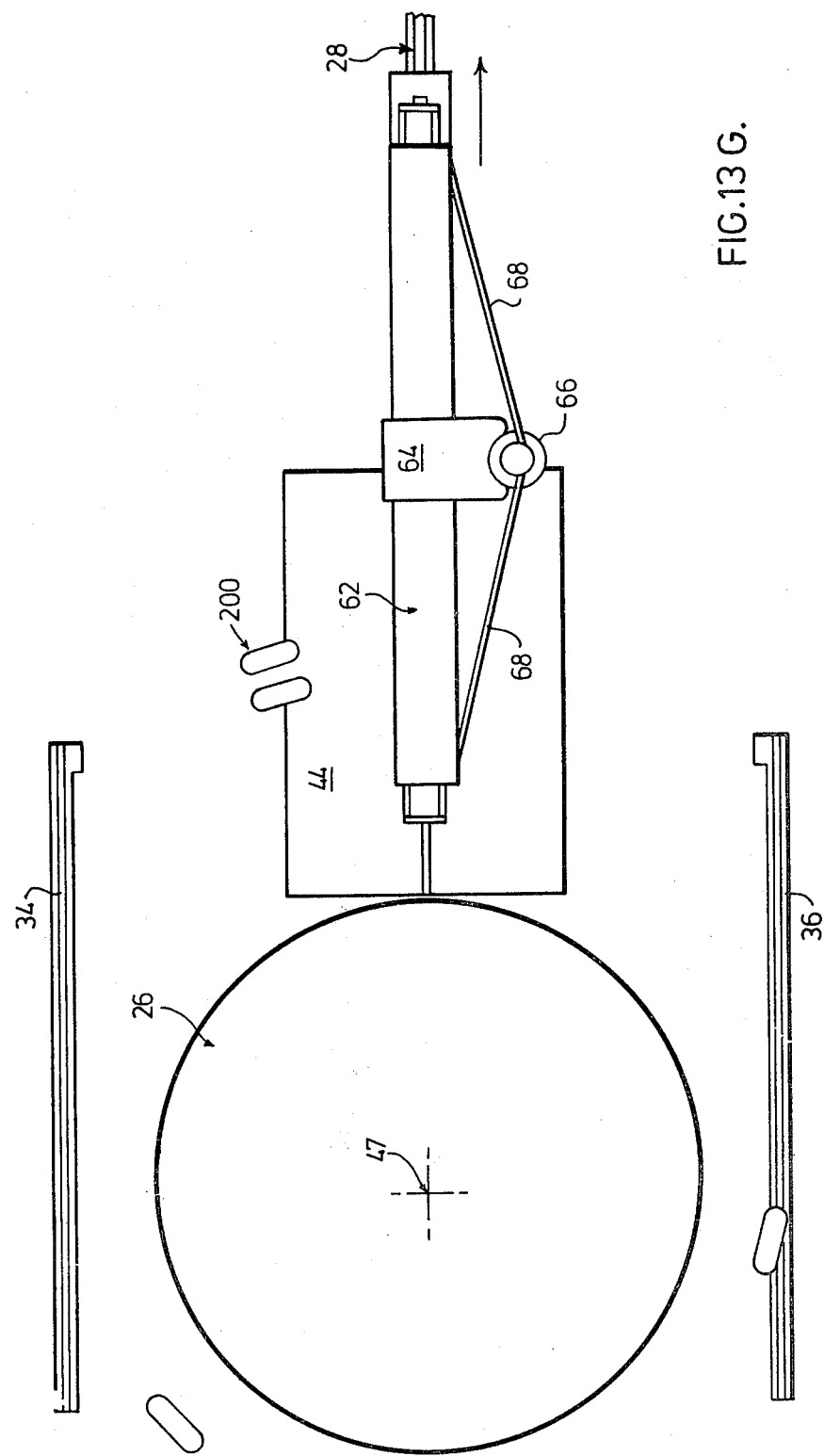
Figure 14:
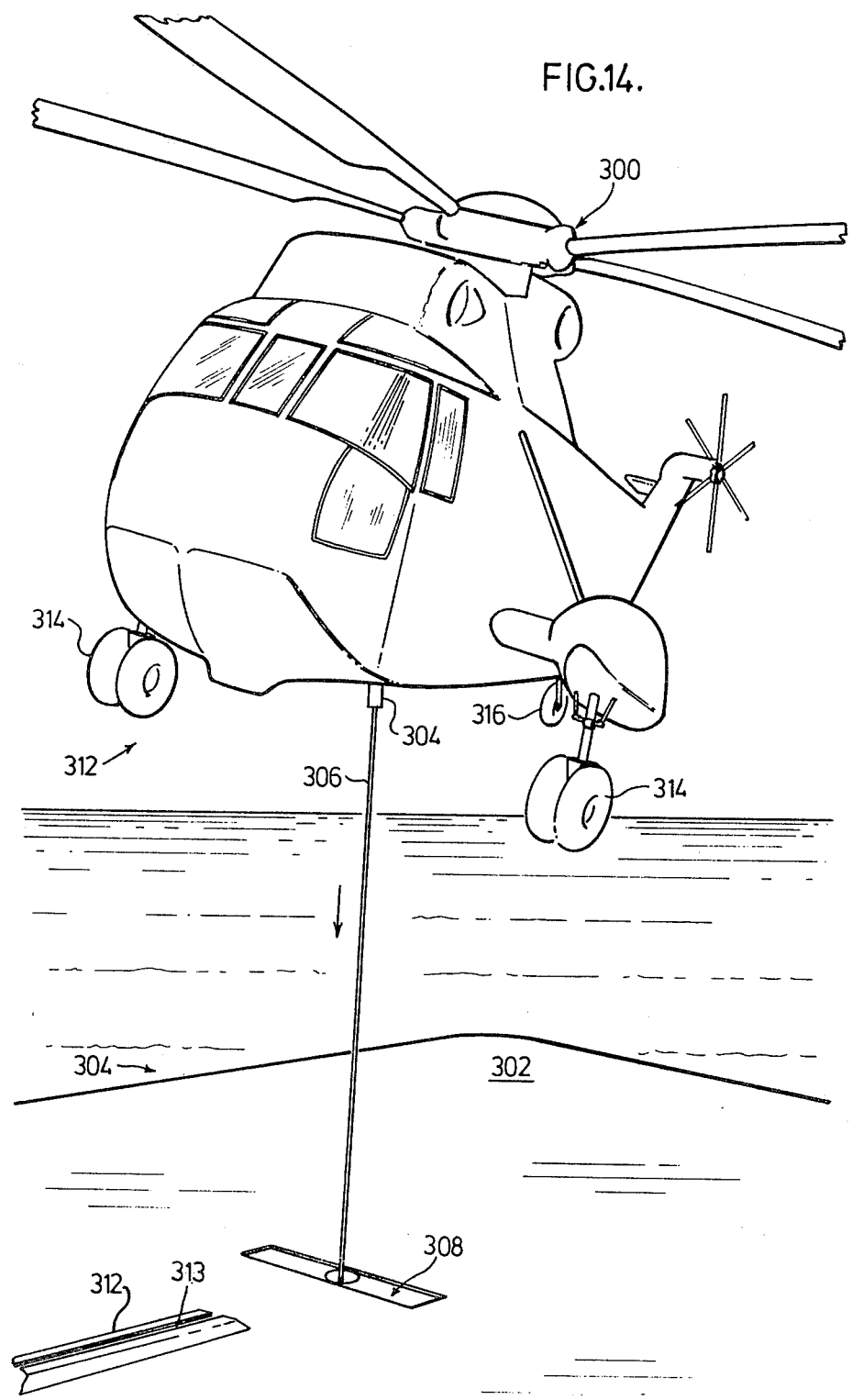
FIG. 14 is a perspective view of a Sea King Helicopter landing on the deck situate at the rear of a frigate with the assistance of a RAST (Recovery Assist Secure and Traverse System)
Figure 15:
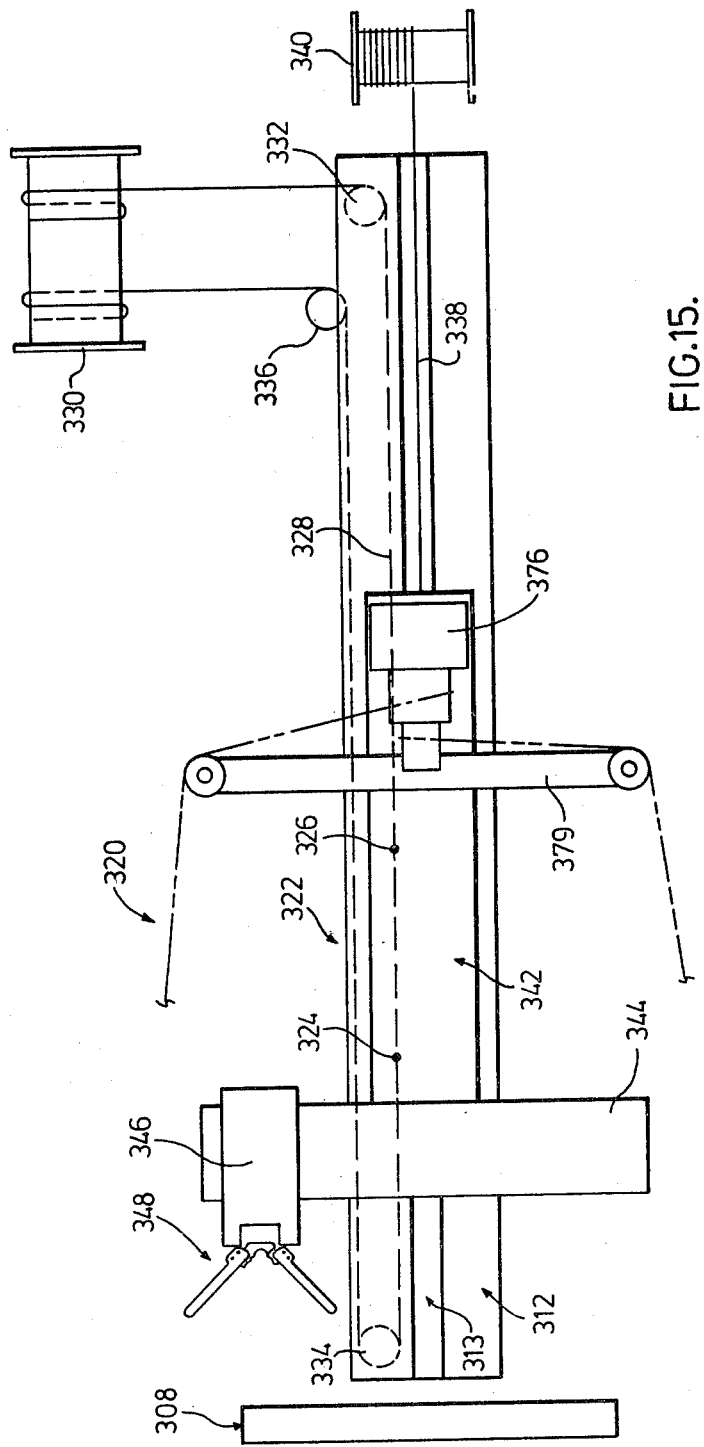
FIG. 15 is a top plan view of a traversing system used to secure a Sea King Helicopter according to a second preferred embodiment of the invention.
Figure 16:
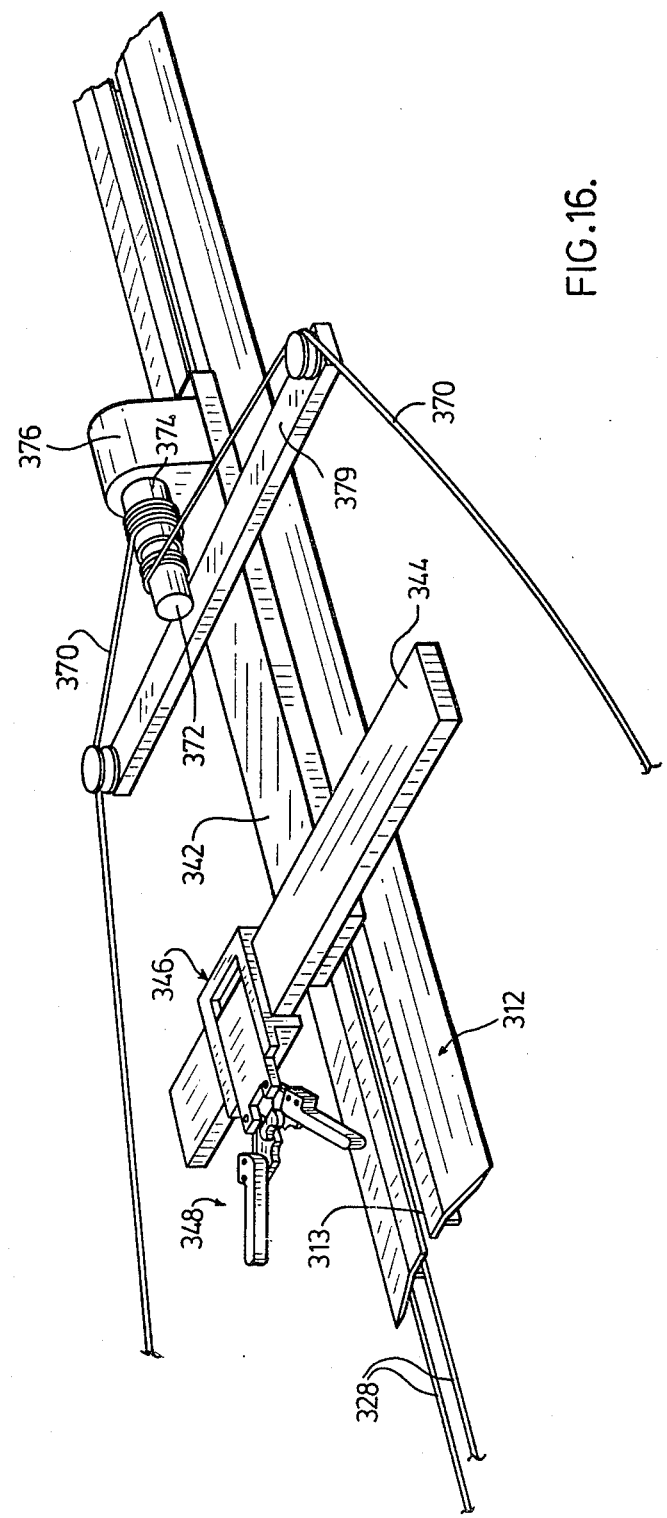
FIG. 16 is a perspective view of part of the traversing system of FIG. 15.
Figure 17:
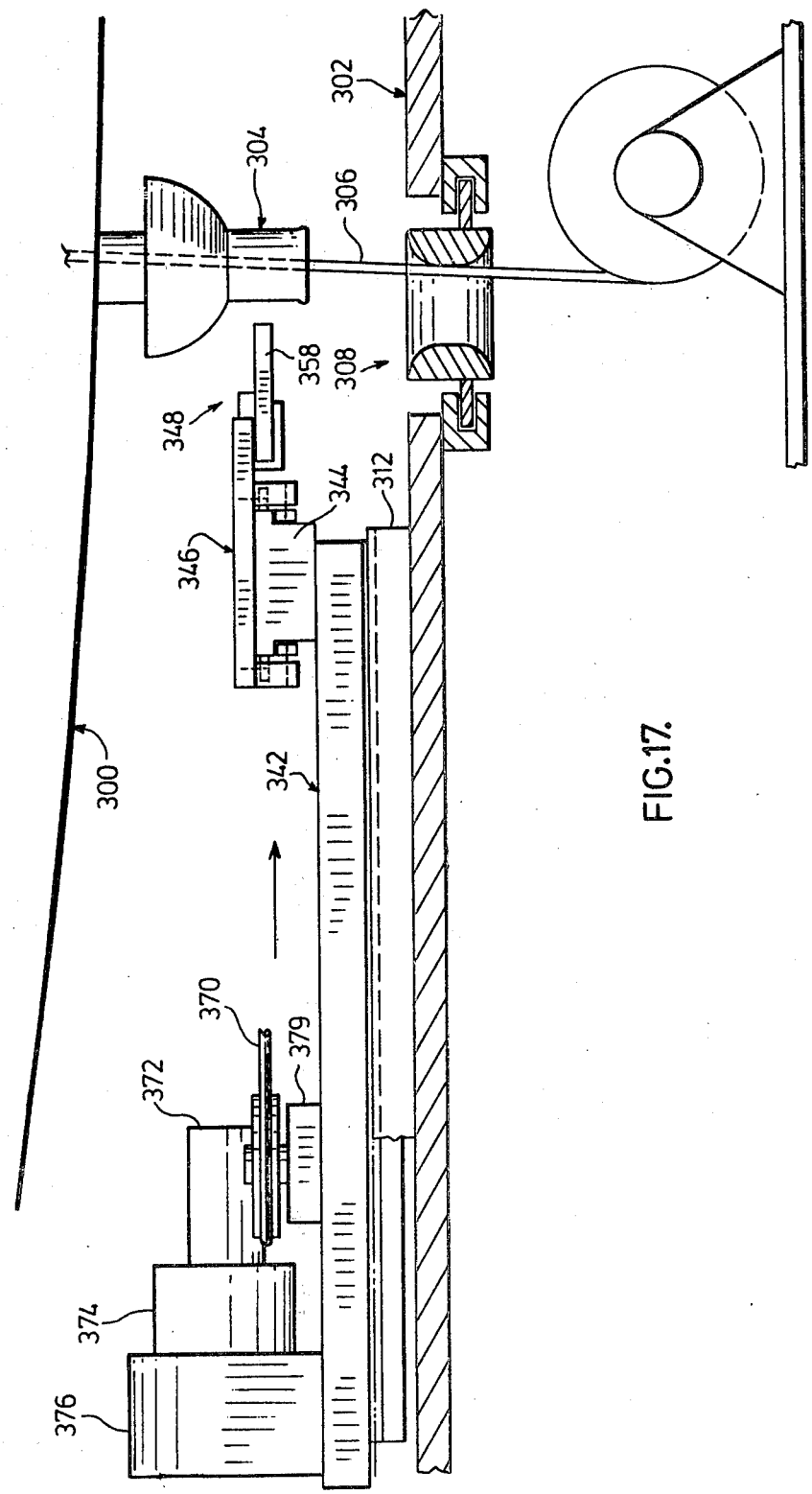
FIG. 17 is a side view of the traverser of the traversing system of FIGS. 15 and 16 being moved into position for securing to the housing of the Sea King Helicopter.
Figure 18:
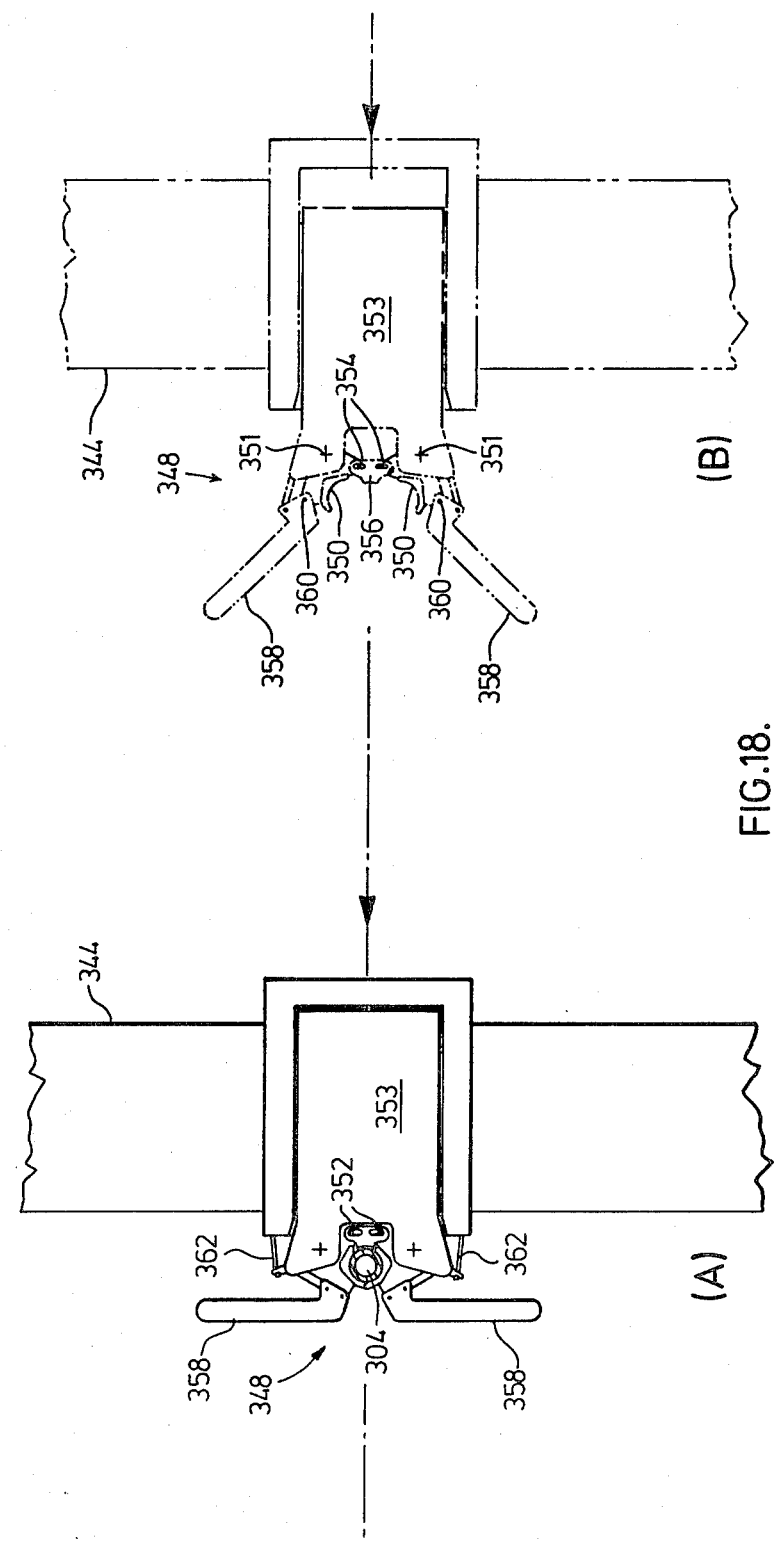
FIGS. 18A and B are top plan views of the operation of the clamp securing means shown in FIG. 17.

In preparation for take-off, the Sea Lynx Helicopter is moved out of the hangar and is positioned as follows, with reference to FIGS. 13A to G inclusive;

With reference to FIG. 13A the Sea Lynx is traversed aft towards the harpoon grid 26 and the outboard restrainers 72 automatically enter the auxiliary tracks 34 and 36;

With reference to FIG. 13B, the traverser is stopped at the take-off position, (center of grid) the main wheels are skewed, and the nose wheel 200 is rotated, the port chock 156 is stowed, the gantry is appropriately positioned for removal of the nose wheel from wheel recess 153 and the cable is attached to the nose wheel;

With reference to FIG. 13C, the nose wheel is winched to port to clear the traverser base assembly 54. The winch gantry is stowed, the Sea Lynx appropriately tied down, the auxiliary struts 68 removed from the pair of spaced wheel units and stowed, the harpoon retracted from the retainer of the traverser and the traverser moved forwardly approximately six to twelve inches and the harpoon is hydraulically lowered to grip the ship grid 26 (See FIG. 13D). Cap 77 is then unscrewed releasing the pressure of plate 78 on leg 74, one of levers 75 is rotated to withdraw the restrainers from the auxiliary tracks 34 and 36 and the cross-beam is rotated only partially (See FIG. 13E) because it would interfere with the harpoon if fully rotated. Note also that the carriage is positioned on the starboard side of the traverser because the nose wheel is in the port quadrant. The traverser is then moved forward as shown in FIG. 13F to clear the harpoon and the cross-beam assembly is rotated until it is in position shown in FIG. 12G. Lever 70 is then rotated to lock pin 63' to secure cross-beam assembly against pivotal movement with respect to base assembly 54 and the traverser is withdrawn;

With reference to FIG. 14, Sea King Helicopter 300 is assisted in landing on the rear deck 302 of frigate 304 by the RAST System employing messenger winch 304 mounted externally on the helicopter and flydown cable 306 extending therefrom secured in self-centering and self-balancing sliding bell mouth 308;

Once landed, the Sea King Helicopter 300 is traversed to the hangar (not shown) by traverser 322 (See FIGS. 15, 16, 17 and 18) along track 312, having slot 313 terminating proximate bell mouth 308, track 312 being of the same construction as track 28 used for traversing the Sea Lynx. Because the Sea King 300 has a conventional undercarriage 312 comprising spaced dual wheel units 314 and rear wheel 316 free wheeling through 360°, traverser system 50 has been modified to comprise traverser system 320 (Shown in FIG. 15) comprising traverser 322 secured at 324 and 326 to greased cable 328 suitably controlled to be played out from winch 330 passed about sheaves 332 and 334 below slot 313 in track 312 and returned for take-up on winch 330 around sheave 336 for moving traverser 322 on the deck 302 of ship 304. Electrical Cable 338 supplies traverser 332 with power and is played out from and taken up under tension by, spring wound cable reel 340 and is dragged along the floor or trough of track 312 as the traverser moves on track 312. Traverser 322 comprises base assembly 342 supported above slot 313, and cross-beam assembly 344 fixed at substantially 90° to base assembly 342, deck lock carriage 346 slidable on cross-beam assembly 344 constructed substantially the same as deck lock carriage 64 on cross-beam assembly 62, the retainer clamp 348 for securing to messenger winch 304 as shown in FIGS. 16, 17, With reference to FIG. 18, retainer clamp 348 comprises jaws 350 pivotally secured at 351 in housing 353 and pivotable by pins 352 in slots 354 of coupling bracket 356. Contact levers 358 are secured to jaws 350 at the ends 360 of jaws 350 and by pins 362 to housing 353;

With reference to FIG. 17, when retainer clamp 348 of traverser 322 is brought to engage and engages messenger winch housing 304 so that housing 304 engages bracket 356 between opened jaws 350 (as in FIG. 18) contacts levers 358 are rotated towards one another pivoting jaws 350 on pins 351 and sliding pins 352 in slot 354 away from one another, closing jaws 350 around housing 304 as shown in FIG. 18B;

Traverser 322 also includes independently operable cables 370 (See FIGS. 15 and 16) extending from independently operable reels 372 and 374 supported for operation on motor housing 376 supporting a motor (not shown) for operating reels 372 and 374. Each of cables 370 extend around sheaves 378 supported on cross support 379 (supported on base 342) for securing to wheels 314 of Sea King Helicopter 300;

USE OF TRAVERSER WITH SEA KING

Figure 19A:
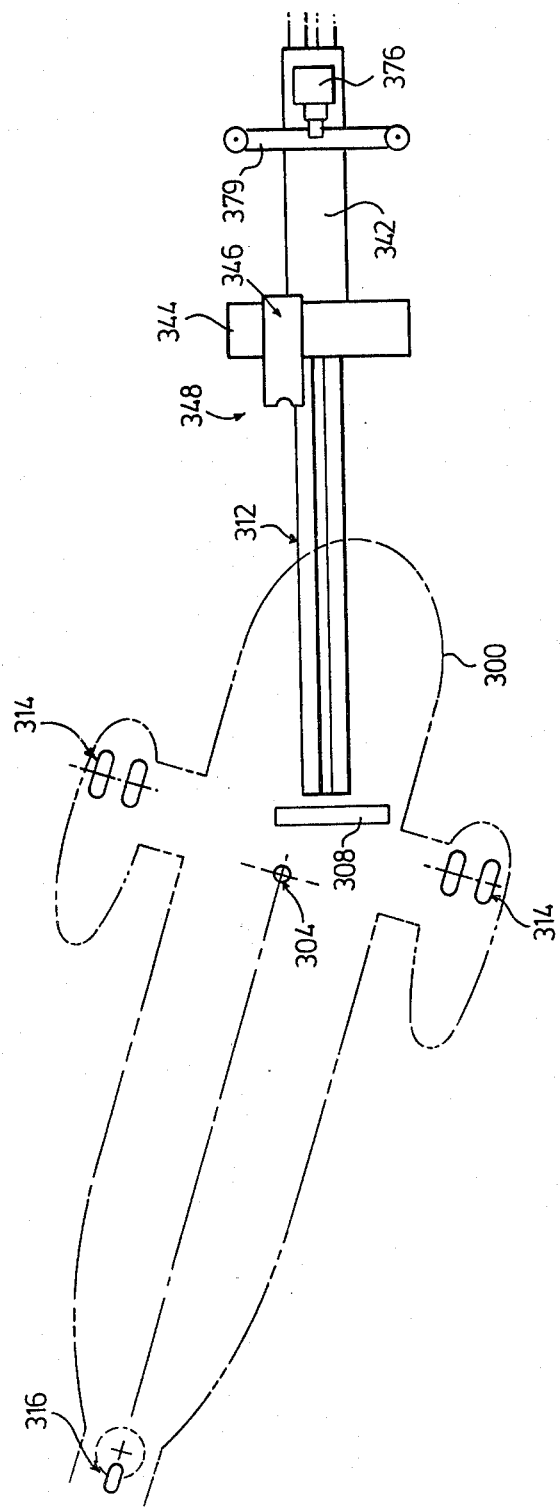
FIGS. 19A and 19E illustrate diagrammatically a method of securing the Sea King Helicopter to the traverser and withdrawing the helicopter to the hangar for storage.
Figure 19:
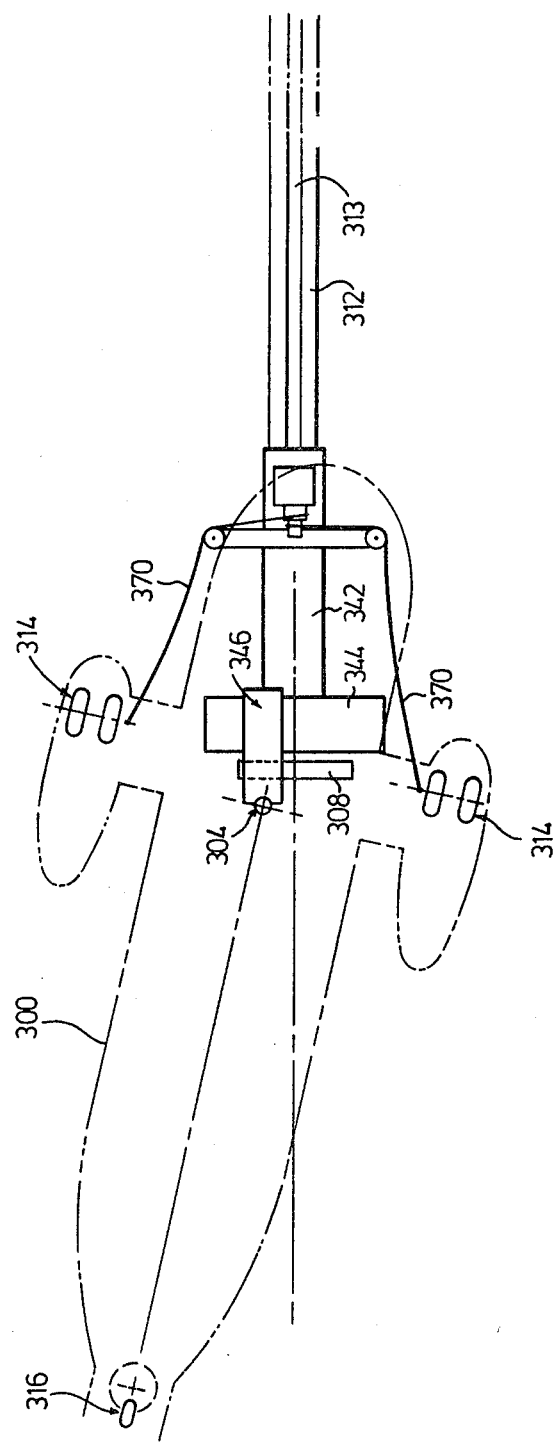
Figure 19C:
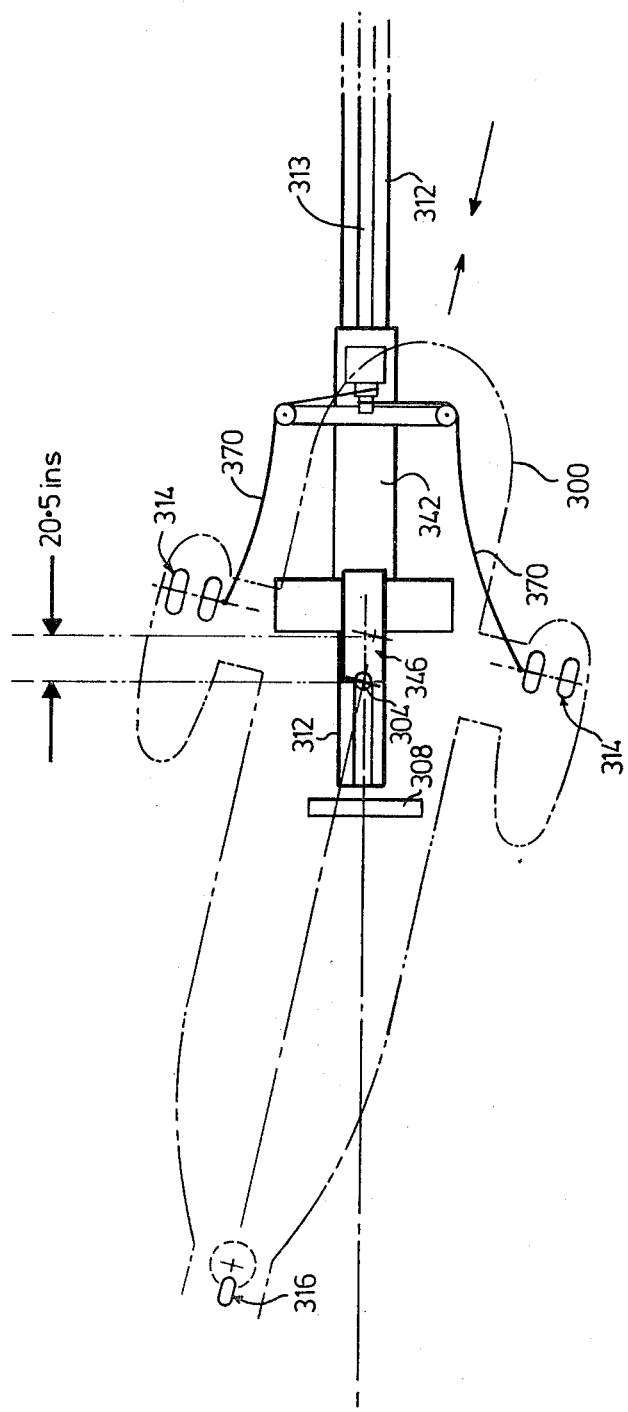
Figure 19:
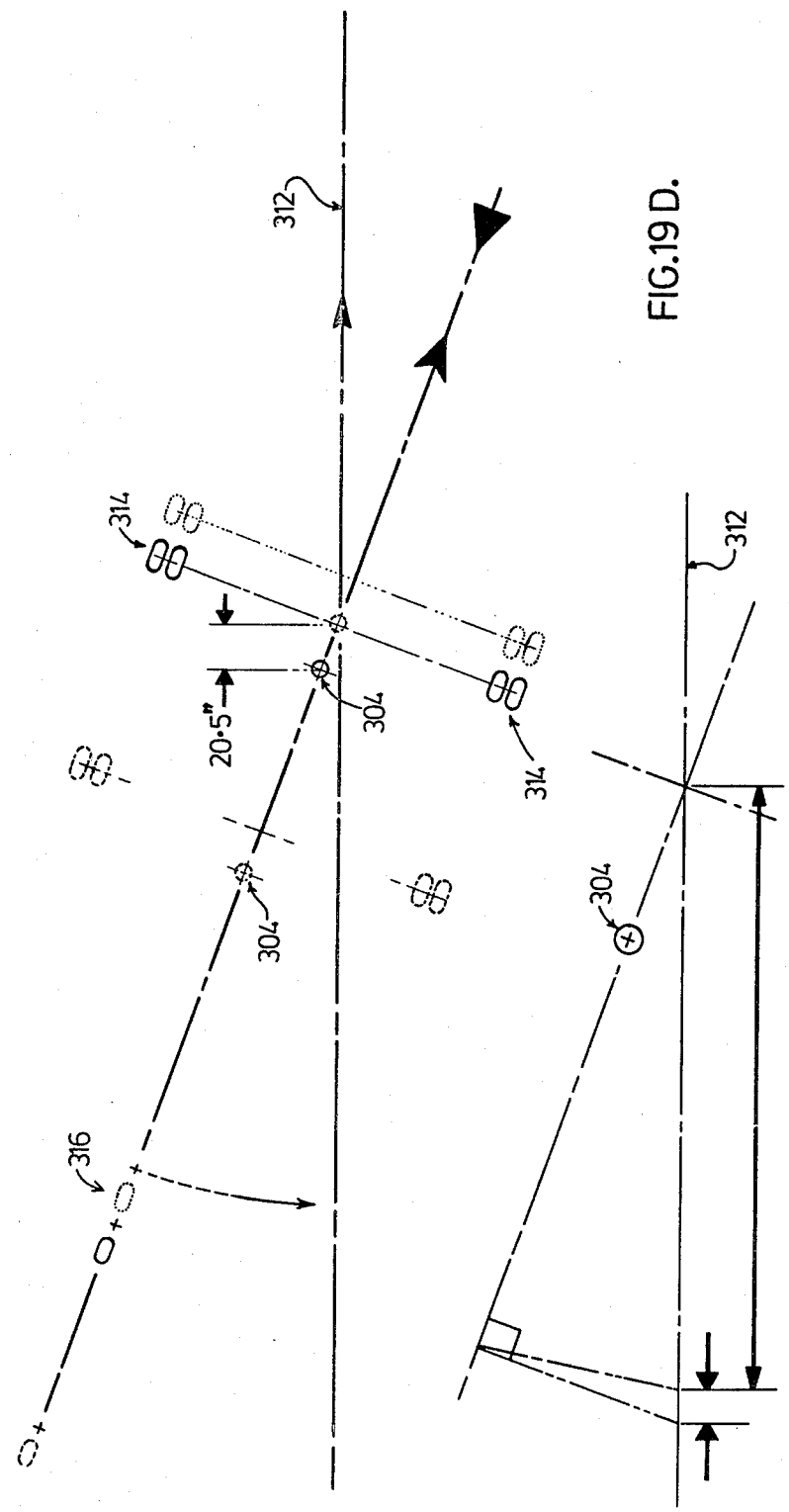
Figure 19E:
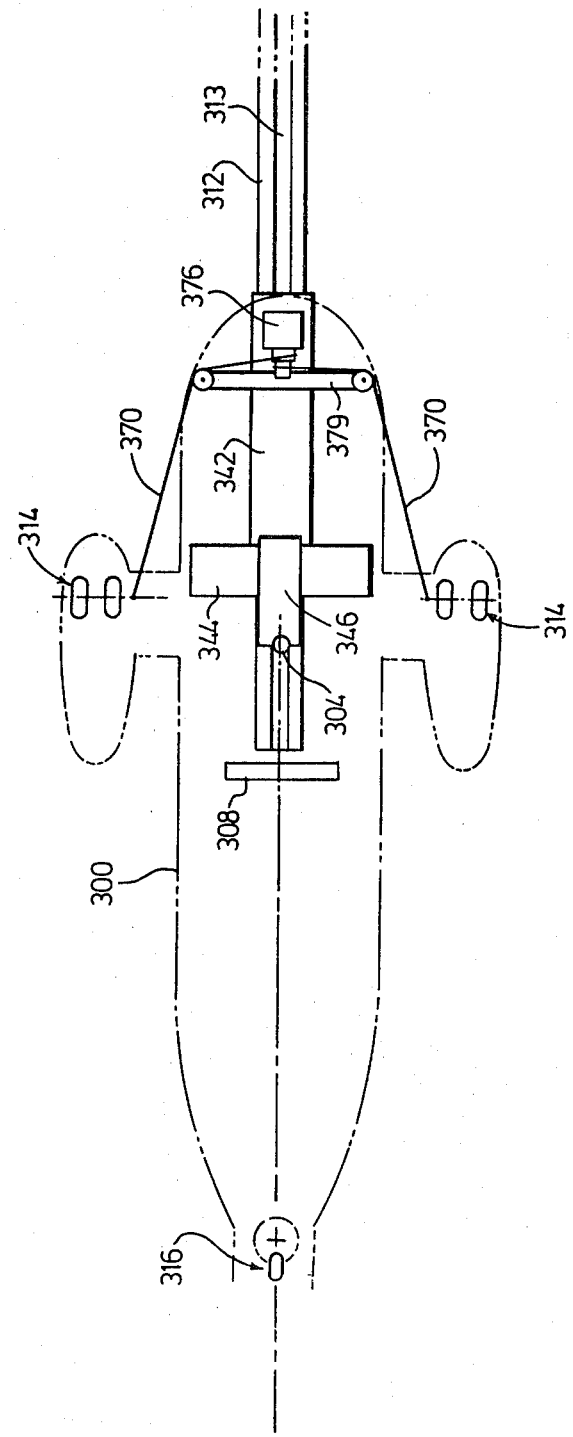
Figure 20A:
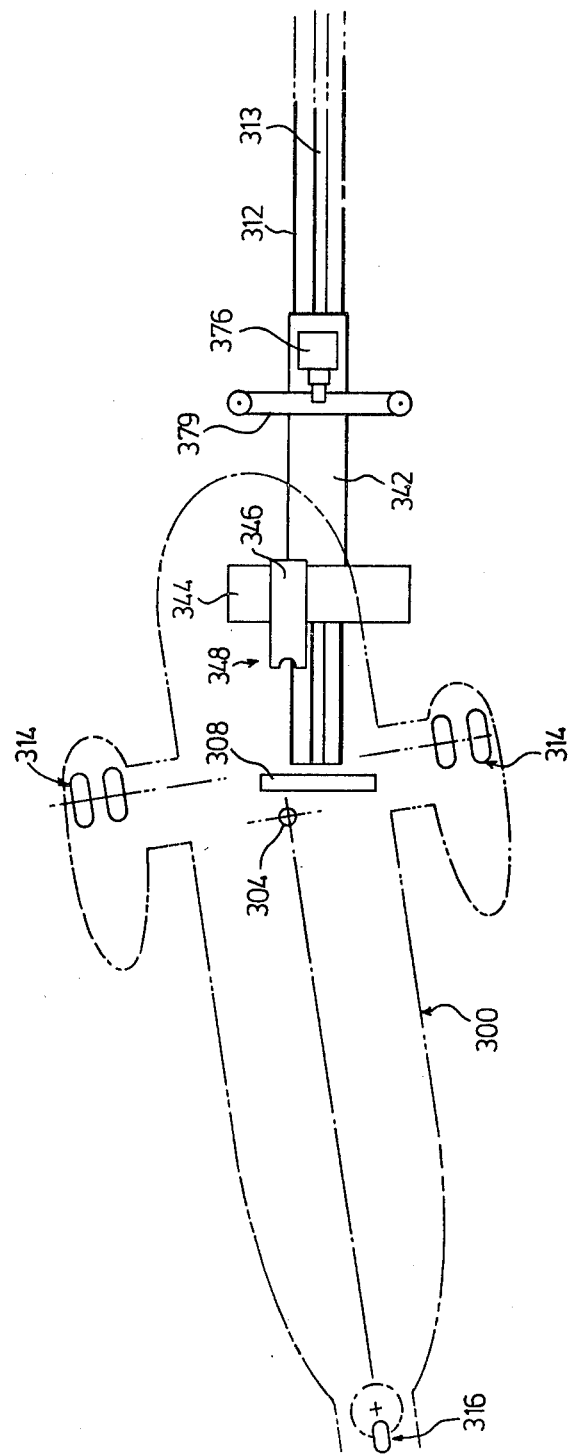
FIGS. 20A to 20C illustrate another method of securing the Sea King Helicopter to the traverser.
Figure 20:
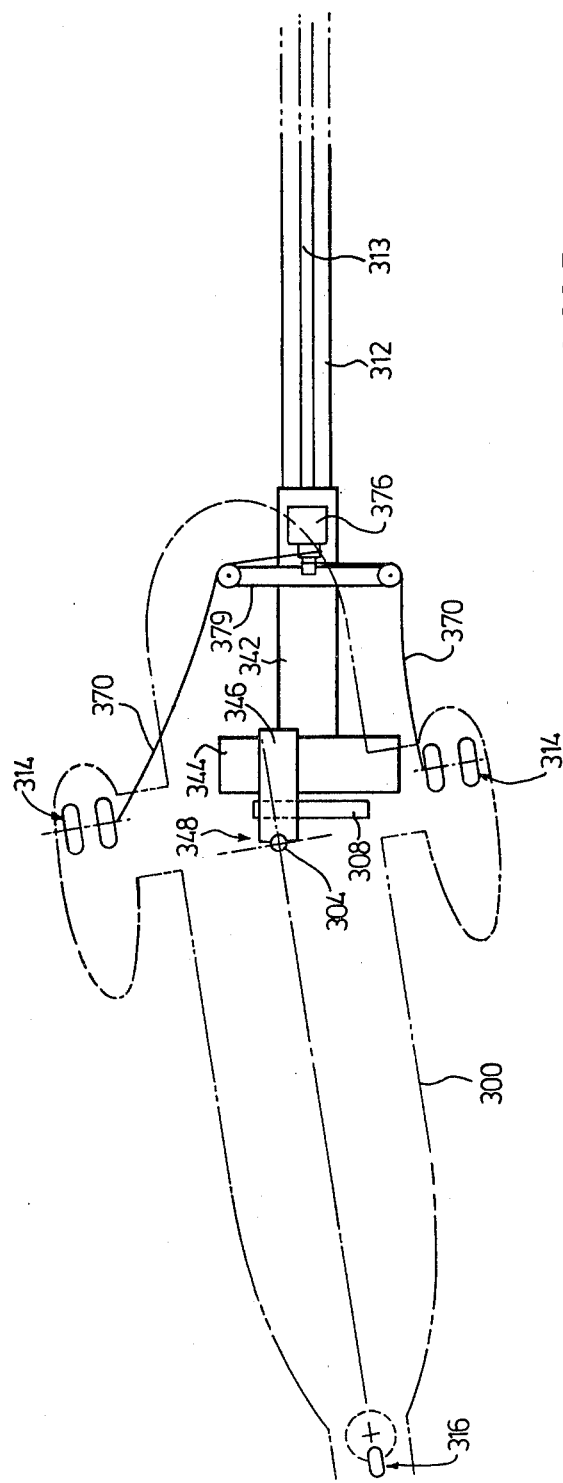

The operation of traversing system 320 for traversing the Sea King Helicopter 300 is illustrated with reference to FIGS. 19A and 19E inclusive and FIGS. 20A and 20C inclusive;

FIG. 19A illustrates the offset landing of the Sea King Helicopter to port with the Sea King Helicopter angled to starboard. The remaining FIGS. 19B and 19E inclusive illustrate the method of traversing helicopter 300 using traverser 322;

FIG. 20A illustrates the offset landing of the Sea King Helicopter to port with the Sea King Helicopter angled to port. The remaining FIGS. 20B and 20C illustrate the method of traversing helicopter 300 using traverser 322;

With reference to FIGS. 19A through 19E inclusive, the Sea King 300 lands with the airborne messenger winch slightly ahead of the bell mouth and to port of the track centerline. The helicopter is angled to starboard. The aircraft handler moves the traverser aft towards the Sea King. The aircraft handler manually cranks the carriage on the traverser to port so that it is approximately in line with the airborne messenger winch. Note the helicopter always lands with the tail wheel locked (See FIG. 19A);

With reference to FIG. 19B, traverser 322 is moved further aft until clamp retainer 348, contacts the housing of the airborne messenger winch, centers itself and, automatically latches onto the housing due to the force of the traverser moving aft. The aft movement of traverser is stopped upon completion of the clamping action of retainer 358 on messenger winch 304. Cables 370 are attached to tie-down rings on the port and starboard main undercarriage of the helicopter. Cables 370 are left slack. The tail wheel remains locked;

With reference to FIGS. 19C and 19D, the helicopter is traversed forward with the carriage 346 freely slidable on cross-beam assembly 344. The aircraft handler visually monitors the undercarriage cables 370 and makes any necessary adjustments to avoid tautness. The purpose of the slack cable is to prevent Sea King rotation that may be caused by a combination of high cross winds and violent ship motion;

Helicopter 300 and traverser 322 are moved forward until the carriage which is clamped to the messenger winch housing, crosses the mid point of the cross-beam 344 which coincides with the centre line of the track, alerts the aircraft handler at the control panel by means of a flashing light on the Stop Traverse light display (not shown). The aircraft handler then stops the traverser 322 and moves it aft a distance of 20.5" indicated by an increase in the flashing frequency of the Traverse Stop light, followed by a steady light when the 20.5" aft movement has been completed. Thereafter the traverser 322 is stopped;

With reference to FIG. 19E the tail wheel is unlocked and the aircraft handler rotates helicopter 300 by means of reels 372 and 374 on cross support 379. When the aircraft is correctly aligned to the track as designated by the tail wheel resting on an extended line of the track, the rotation is stopped. The helicopter is then traversed slightly forward to straighten and lock the tail wheel. Any slack in cables 370 is removed.

Figure 20C:
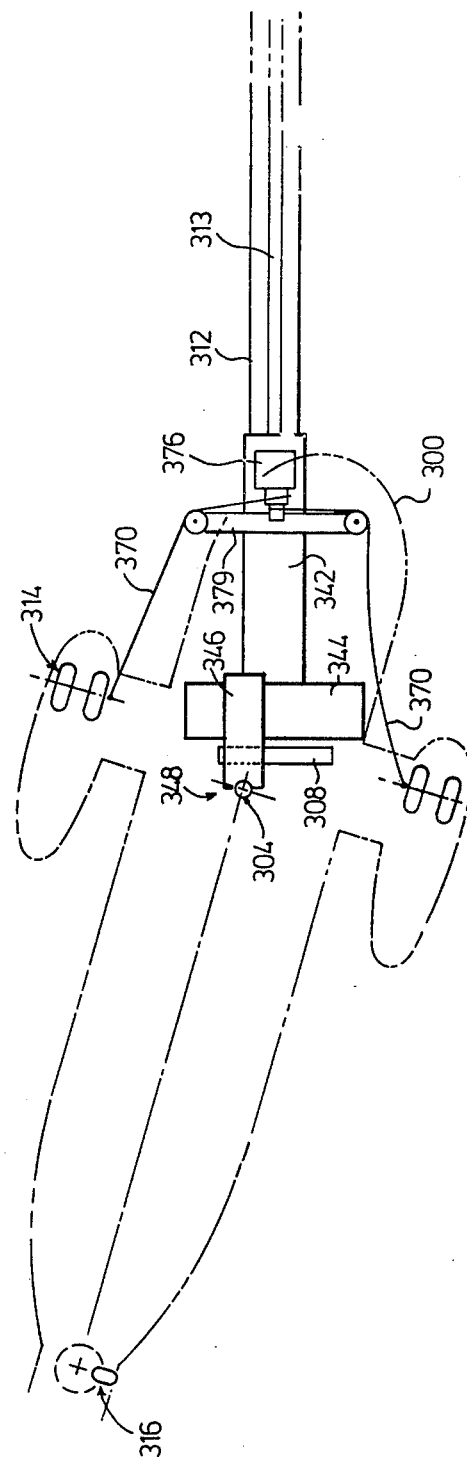

With reference to FIGS. 20A to 20C inclusive, the Sea King helicopter 300 with airborne messenger winch 304 lands slightly aft of bellmouth 308 and to port of the track centre line. The Sea King 300 is angled to port. The aircraft handler moves traverser 322 aft towards Sea King 300 and manually cranks the carriage 346 of traverser 322 to port so that it is approximately in line with the airborne messenger winch. Note the helicopter always lands with the tail wheel locked (See FIG. 20A);

Traverser 322 is moved further aft until retainer 348 contacts housing 304 of the airborne messenger winch, centers itself and automatically latches onto housing 304 due to the force of the traverser aft motion. The aft motion of the traverser is stopped upon completion of the clamping action. Cables 370 are attached to the tie down rings on the port and starboard main undercarriage. In case the port strap is tightened, the tail wheel is unlocked by the aircraft handler inside the Sea King, (See FIG. 20B);

With reference to FIG. 20C, traverser 322 is moved forward and at the same time, the helicopter's nose is swung to starboard by the operation of reels 372 and 374 on the traverser applying tension to the port strap. This compound motion is performed by the aircraft handler using the traverser control lever. The forward motion facilitates the castoring of the tail wheel. With the helicopter nose pointed to starboard at an angle of 5 to 10 degrees the cables 370 are released and the tail wheel is locked in the track position. The subsequent procedures shown in FIGS. 19C to 19E inclusive are carried out;

PREPARATION FOR TAKE-OFF

The Sea King Helicopter is traversed aft with the tail wheel locked, and the cables 370 taut. The aft traverse motion is stopped when the airborne messenger winch is directly over the bellmouth 308. The recovery assist cable 306 is connected to the airborne messenger winch 304 and tension is applied by constant tension winch 370 below deck 302. Cables 370 are removed clamp retainer 348 released from the housing of the airborne messenger winch 304 and the traverser is moved forward to clear helicopter 300.

As many changes could be made in the preferred embodiments of the invention without departing from the scope of the invention, it is intended that all matter contained in the preferred embodiments be interpreted as illustrative thereof and not in a limiting sense.

The embodiments of the invention in which an exclusive property or privilege is claimed are as follows:

1. A traversing system for traversing a Sea Lynx Helicopter having laterally spaced wheel units, a nose wheel and a harpoon for securing to a grid system mounted on the deck of a ship, from its landing position to a storage position into a hanger on the ship, which ship includes a grid system used to secure the Sea Lynx Helicopter to the deck of the ship, the traversing system comprising a traverser, means for securing the traverser to the ship deck and means for traversing the traverser on the ship deck to and from the hangar and a position proximate the landing position, control means for controlling the movement of the traverser, the traverser being relatively narrow and of a low profile for clearing the deck of the ship for positioning under the helicopter over the grid system without interfering with the grid system, the traverser comprising a relatively narrow base assembly and means to secure the nose wheel therein, the base secured to the means for traversing the traverser on the ship deck, a relatively long, relatively narrow cross-beam assembly pivotally secured to the base, pivotal from a position substantially parallel to the traverser base to a position at substantially 90° to the direction of movement of the base when securing the helicopter to the traverser, a carriage supported on the cross-beam assembly for movement therealong, control means for controlling the movement of the carriage, retaining means carried by the carriage for use to secure the harpoon of the helicopter including a pair of pivotally mounted struts for securing to the laterally spaced wheel units of the helicopter to triangulate the retaining means and harpoon connection for stabilizing the harpoon when secured to the retaining means.

2. The traversing system of claim 1, wherein restrainers are provided on the ends of the cross-beam assembly for securing the ends of the cross-beam in guides situate on either side of the deck mounted grid used for securing the harpoon to the deck, and which restrainers are not interfered with by the laterally spaced guides when the traverser is withdrawn to the hangar.

3. The traversing system of claim 2, wherein the traverser further comprises means to draw the nose wheel into the nose recess.

4. The traversing system of claim 3 wherein the means to draw the nose wheel into the nose recess, comprises a gantry including sheaves therein, mounted on the base pivotable to extend from either side of the base, a winch, cable stored on the winch for passage over the sheaves in the gantry and means secured to the end of the cable to be secured to the nose wheel of the Sea Lynx Helicopter.

5. A traversing system for traversing a helicopter having laterally spaced wheel units on the deck of a ship from its landing position to a storage position into a hanger on the ship, the traversing system comprising a traverser, means for securing the traverser to the ship deck and means for traversing the traverser on the ship deck to and from the hangar and a position proximate the landing position, control means for controlling the movement of the traverser, the traverser being of low profile for clearance under the helicopter and being relatively narrow and comprising a relatively narrow base in width secured to the means for traversing the traverser on the ship deck, relatively long, relatively narrow carrier means on the base for mounting a carriage for movement thereon, the carrier means to extend substantially at right angles to the direction of movement of the base when securing the helicopter to the traverser, a carriage movable on the carrier means on the base for mounting the carriage, control means for controlling the sliding of the carriage on the carrier means for mounting the carriage, retaining means carried by the carriage for use to secure the helicopter and independently adjustable cables extending from the traverser for being secured to the laterally spaced wheel units for both securing the helicopter and positioning the helicopter with respect to the traverser.

6. The traversing system of claim 5, for traversing a Sea King Helicopter, wherein the independently adjustable cables are secured to independently operable winches or reels carried by the traverser, the cables to be played out or taken up for acting on one or both of the laterally spaced wheel units for orienting or maneuvering the Sea King Helicopter.

7. A traverser for use in a traversing system for traversing a Sea Lynx Helicopter, on the deck of a ship, the Sea Lynx Helicopter having laterally spaced wheel units, a nose wheel and a harpoon for securing to a grid system mounted on the ship deck, the traverser being of low profile for clearance under the helicopter and being relatively narrow and comprising a narrow base in width to be secured to means for traversing the traverser to clear the ship's deck, wherein the base portion of the traverser carrying the cross-beam clears the deck to permit being positioned over the grid system used to secure the Sea Lynx to the deck of the ship, without interfering with the grid system, a nose receiving wheel recess in the base and means to secure the nose wheel therein, a relatively long, relatively narrow cross-beam assembly carried by the base, being pivotal with respect to the base from a position substantially parallel to the traverser base to a locked position at substantially 90° to the direction of movement of the base when securing the helicopter to the traverser, a carriage slidable on the cross-beam, positive control means for controlling the sliding of the carriage on the cross-beam, retaining means for securing the helicopter to the traverser and a pair of pivotally mounted struts to be secured to the pair of laterally spaced wheel units to triangulate the retaining means and harpoon connection for stabilizing the harpoon when secured to the retaining means.

8. The traverser of claim 7, wherein restrainers are provided on the ends of the cross-beam assembly for securing the cross-beam in guides situate on either side of the deck mounted grid used for securing the harpoon to the deck, and which restrainers are not interfered with by the laterally spaced guides when the traverser is withdrawn to the hangar.

9. The traverser of claim 8 wherein further comprising means to draw the nose wheel into the nose recess.

10. The traverser of claim 9, wherein the means to draw the nose wheel into the nose recess, comprises a gantry including sheaves therein, mounted on the base pivotable to extend from either side of the base, a winch, cable stored on the winch for passage over the sheaves in the gantry and means secured to the end of the cable to be secured to the nose wheel of the Sea Lynx Helicopter.

11. A traverser for use in a securing system, for traversing a helicopter having laterally spaced wheel units on the deck of a ship, the traverser being of low profile for clearance under the helicopter and being relatively narrow and comprising a narrow base in width to be secured to means for traversing the traverser to clear the ship's deck, on the ship deck, a relatively long, relatively narrow cross-beam assembly carried by the base to extend substantially at right angles thereto when securing the helicopter to the traverser, a carriage slidable on the cross-beam, positive control means for controlling the sliding of the carriage on the cross-beam, retaining means for securing the helicopter to the traverser and independently adjustable cables extending from the traverser to be secured to the laterally spaced wheel units for both securing the helicopter and positioning the helicopter with respect to the traverser.

12. The traverser of claim 11, wherein the traversing system is applied to traversing a Sea King Helicopter, wherein the independently adjustable cables are secured in independently operable winches or reels carried by the traverser, the cables to be played out or taken up for acting on one or both of the laterally spaced wheel units for orienting or maneuvering the Sea King Helicopter.

13. A traverser for securing to a Sea Lynx Helicopter having laterally spaced single wheel units for traversing it to and from a hangar on a ship having a passive grid system used to secure the Sea Lynx to the deck of a ship, the traverser having a low profile for passage under the helicopter without interfering with the passive grid of the helicopter recovery system, and comprising a relatively narrow base in width having a nose receiving recess therein for receiving the nose wheel of the Sea Lynx Helicopter, means for drawing the nose wheel into the recess and means securing the nose wheel therein, a relatively long, relatively narrow cross-beam pivotally carried by and secured to the base for relative pivotal movement with respect thereto from a position co-linear with the base to a position substantially at right angles thereto, restrainers on the end of the cross-beam for locking into guides secured to the ship deck on either side of the grid of the helicopter haul down system when the cross-beam is pivoted substantially at right angles to the base for assisting to secure to the cross-beam, a carriage slidably secured to the cross-beam for relative movement with respect thereto, control means for controlling the carriage's movement on the cross-beam, retaining means carried by the carriage for use to secure the helicopter to the traverser, the retaining means comprising a miniature passive grid of similar construction to the passive grid mounted in the deck used for securing the Sea Lynx by means of its hydraulic operated harpoon to the deck of the ship, and supports extending from the carriage-retaining means combination for securing to the laterally spaced single wheel units triangulating the retaining means and harpoon when the harpoon is secured to the retaining means for stabilizing the harpoon when secured to the retaining means.

14. The traverser of claim 13, wherein the restrainers on the end of the cross-beam comprise rollers pivotally supported on the end of the cross-beam for pivoting from a position coplanar with the plane of the cross-beam to a position at right angles thereto and when pivoted to such position at right angles to the cross-beam also being pivotable to move inwardly towards the other roller, at the other end of the cross-beam and means are provided to lock the rollers in the inwardly pivoted position.

15. A traverser for securing to a Sea King Helicopter, having laterally spaced single wheel units and a winch housing for use in a traversing system for traversing it to and from a hangar, the traverser having a low profile for passage under the helicopter and comprising a relatively narrow base, a cross-beam assembly carried by the base at substantially right angles to the base, a carriage slidably secured to the cross-beam for relative movement with respect thereto, control means for controlling the carriage's movement on the cross-beam, retaining means carried by the carriage for use to secure the helicopter to the traverser, the retaining means comprising means to grasp the winch housing mounted on the Sea King Helicopter, and supports in the form of separately operable cables extending from the traverser for securing to the laterally spaced single wheel units intermediate the body of the helicopter, for stabilizing the helicopter and for orienting the helicopter when secured to the traverser.

16. A method of traversing a Sea Lynx Helicopter having a harpoon for securing to a passive deck mounted grid mounted on the ship deck, a tricycle undercarriage having a pair of laterally spaced wheels and having a nose wheel, employing a traverser clearing the deck of the ship for passage under the helicopter, the ship having a passive deck mounted grid for securing the helicopter to the deck of the ship, the traverser having a relatively narrow base, a cross-beam assembly pivotally secured to the base from a position co-linear with the base to a position at right angles to the base, a carriage controllably slidable on the cross-beam assembly, a retainer carried by the carriage for securing the helicopter to the traverser, restrainers on the ends of the cross-beam assembly for assisting to secure the cross-beam assembly at substantially right angles to the base, for securing in guides on either side of the passive deck mounted grid, struts secured to the carriage-retainer combination for securing to the pair of laterally spaced wheels and a nose wheel recess in the base for receiving the nose wheel of the Sea Lynx and securing it thereto, the method comprising the steps of:
(a) positioning the helicopter on landing with respect to the grid on the deck of the ship so that the line formed between the harpoon and nose wheel intersects the line of movement of the traverser or an extension of it;
(b) moving the traverser past the nose wheel of the helicopter with the cross-beam substantially parallel to the base, and pivoting the cross-beam to a position substantially at right angles to the base and securing the restrainers to the guides;
(c) positioning the retaining means on the cross-beam assembly adjacent the harpoon to be secured thereto, and securing the harpoon thereto;
(d) with the nose wheel aligned in the direction of the body of the helicopter, and the carriage being freely slidable on the cross-beam, withdrawing the traverser towards the hangar until the retaining means passes over the line of movement of the traverser (or an extension thereof) and continuing the withdrawl of the traverser for a predetermined distance of 25.5" for positioning the center of the line joining the two laterally spaced wheels over the line (or extension) along which the traverser moves;
(e) rotating the helicopter to move the nose wheel into a recess in the traverser base and securing same within the recess with the dual wheels aligned parallel to the direction of movement of the traverser;
(f) withdrawing the traverser.

17. A method of traversing helicopters on a ship deck after being secured to the ship deck by a helicopter ship mounted securing system having a free wheeling rear wheel and a pair of forwardly aligned wheel units as in a conventional undercarriage employing a traverser comprising a base, means to carry a carriage for slidable movement therealong, a carriage controllably movable on the means to carry the carriage, a retainer for securing the helicopter to the traverser, independently operable cables for securing to the pair of forwardly fixed wheel units, comprising the steps of:
(a) positioning the helicopter on landing with respect to the securing system of the ship so that the line formed between the securing system and rear wheel intersects the line of movement of the traverser (or an extension thereof);
(b) moving the traverser and carriage adjacent the member of the helicopter to be secured thereto, and securing it thereto;
(c) securing the independently operable cables to the laterally spaced wheel units for independently acting on one or both;
(d) withdrawing the traverser towards the hangar, the carriage being freely slidable on the means to carry the carriage until the retaining means passes over the line of movement of the traverser or an extension thereof, and moving the traverser a predetermined distance therefrom until the center of the line joining the spaced wheel units coincides with the line of movement of the traverser;
(e) orienting the helicopter to extend in the same direction as the direction of movement of the traverser;
(f) withdrawing the traverser towards the hangar.

18. The process of claim 17 wherein the means to carry the carriage comprises a cross-beam assembly carried by the base at substantially right angles to the direction of movement of the traverser.

19. The process of claim 17 wherein the helicopter traversed is the Sea King and the step of moving the Sea King a predetermined distance after the retaining means passes over the line of movement of the traverser or extension thereof, comprises the steps of backing up the helicopter 20.5" from the point the retaining means passes over such line of movement of the traverser or such extension.

* * * * *